(12) United States Patent
Kanamori

(10) Patent No.: US 10,785,424 B2
(45) Date of Patent: Sep. 22, 2020

(54) RADIATION IMAGE IMAGING APPARATUS AND RADIATION IMAGE IMAGING SYSTEM

(71) Applicant: Konica Minolta, Inc., Tokyo (JP)

(72) Inventor: Koutarou Kanamori, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/535,714

(22) Filed: Aug. 8, 2019

(65) Prior Publication Data

US 2020/0077038 A1     Mar. 5, 2020

(30) Foreign Application Priority Data

Aug. 31, 2018   (JP) ................................. 2018-162271

(51) Int. Cl.
  *H04N 5/345*  (2011.01)
  *H04N 5/3745*  (2011.01)
  *G01T 1/17*  (2006.01)

(52) U.S. Cl.
  CPC ......... *H04N 5/345* (2013.01); *H04N 5/37452* (2013.01); *G01T 1/17* (2013.01)

(58) Field of Classification Search
  CPC .......... H04N 5/32; H04N 5/345; H04N 5/347; H04N 5/37452; G01T 1/17; G01T 1/164; G01T 1/166; G01T 1/1663; G01T 1/1645; G01T 1/208
  See application file for complete search history.

(56) References Cited

U.S. PATENT DOCUMENTS

| 7,961,239 B2 * | 6/2011 | Lee ................... H01L 27/14603 348/308 |
| 8,249,322 B2 * | 8/2012 | Kuwabara ............ H04N 5/3658 378/37 |
| 8,983,035 B2 * | 3/2015 | Noma ...................... H05G 1/64 250/214 DC |
| 9,078,624 B2 * | 7/2015 | Sugizaki ............... G01T 1/2928 |
| 10,194,881 B2 * | 2/2019 | Kawanishi ........... A61B 6/5282 |
| 2005/0067586 A1 * | 3/2005 | Yanagita ............ C09K 11/7733 250/484.4 |

(Continued)

FOREIGN PATENT DOCUMENTS

| JP | 2011206250 A | 10/2011 |
| JP | 6039926 B2 | 11/2016 |

*Primary Examiner* — Chiawei Chen
(74) *Attorney, Agent, or Firm* — Lucas & Mercanti, LLP

(57) ABSTRACT

A radiation image imaging apparatus includes the following. A switch is in an off state if off voltage is applied to the connected scanning line, is in an on state if charge generated in the radiation detecting element is accumulated in the radiation detecting element and the on voltage is applied to the connected scanning line. A hardware processor controls the scanning driver to apply the on voltage to a plurality of adjacent scanning lines at the same time to obtain an image in which a binning number in an extending direction of the signal line is larger than a binning number in an extending direction of the scanning line. The hardware processor performs an enlarged interpolation process on the obtained image to generate an image in which a pixel size in the extending direction of the signal line matches the extending direction of the scanning line.

10 Claims, 11 Drawing Sheets

(56) References Cited

U.S. PATENT DOCUMENTS

| | | | |
|---|---|---|---|
| 2009/0046917 A1* | 2/2009 | Konishi | G06T 3/4007 |
| | | | 382/132 |
| 2011/0176744 A1* | 7/2011 | Ko | G06T 3/4007 |
| | | | 382/264 |
| 2012/0229669 A1* | 9/2012 | Okada | G06T 3/4015 |
| | | | 348/222.1 |
| 2014/0291541 A1* | 10/2014 | Watanabe | H04N 5/32 |
| | | | 250/394 |

* cited by examiner

RADIATION IMAGE IMAGING APPARATUS AND RADIATION IMAGE IMAGING SYSTEM

BACKGROUND

Technological Field

The present invention relates to a radiation image imaging apparatus and a radiation image imaging system.

Description of the Related Art

Development can be seen in various radiation image imaging apparatuses provided with a radiation detector (Flat Panel Detector) which generates charge with a radiation detecting element according to an amount of irradiated radiation and which reads the generated charge as image data.

As shown in FIG. 6, according to the above-described radiation image imaging apparatus, a plurality of scanning lines 5 and a plurality of signal lines 6 are provided intersecting with each other. A radiation detecting element 7 is provided in each region divided by the plurality of scanning lines 5 and the plurality of signal lines 6. A first electrode 74 in each radiation detecting element 7 is connected to a source electrode 8s in each TFT 8 (shown with S in FIG. 6), and a gate electrode 8g in each TFT 8 (shown with G in FIG. 6) is connected to each line L1 to Lx of the scanning lines 5 extending from a gate driver 15b of a scanning driver 15 described later. A drain electrode 8d (shown with D in FIG. 6) in each TFT 8 is connected to each signal line 6.

If the gate driver 15b applies off voltage to the connected scanning line 5, and the off voltage is applied to the gate electrode 8g through the scanning line 5, the TFT 8 becomes an off state. The release of charge from the radiation detecting element 7 to the signal line 6 stops, and the charge generated in the radiation detecting element 7 according to the irradiated radiation is held and accumulated in the radiation detecting element 7.

If the gate driver 15b applies on voltage to the connected scanning line 5, and the on voltage is applied to the gate electrode 8g through the scanning line 5, the TFT 8 becomes an on state. The charge accumulated in the radiation detected element is released from the radiation detecting element 7 to the signal line 6.

Each signal line 6 is connected to each readout circuit 17 formed in a readout IC 16. The charge released from each radiation detecting element 7 flows through the signal line 6. Charge/voltage conversion and sampling are performed in the readout circuit 17. The A/D convertor 20 converts the result to image data in a digital value.

Lately, binning to combine a plurality of pixels into one pixel for the purpose of high speed readout and reduction of noise is performed. For example, binning in the vertical direction (extending direction of the signal line 6) can be performed by turning on the gate electrodes 8g of a plurality of adjacent lines at the same time (analog binning) Binning in the horizontal direction (extending direction of the scanning line 5) can be performed by adding or averaging the value of the plurality of adjacent pixels in the horizontal direction of the image data (digital binning).

As the technique regarding the binning, for example, patent document 1 (JP 6039926 B) describes, for the purpose of reducing random noise, setting a combination of an analog binning size and a digital binning size according to a frame rate and a binning size (number of pixels combined in one pixel, binning number) included in the imaging parameter to perform binning.

Patent document 2 (JP 2011-206250) describes changing the binning size according to the entering angle of the radiation into the radiation detector.

The binning number in the vertical direction and the binning number in the horizontal direction are usually combined as described in patent document 1. However, if the binning number in the vertical direction is increased in order to achieve high speed readout, the binning number in the horizontal direction also increases. As a result, resolution decreases in both the vertical direction and the horizontal direction.

According to patent document 2, the binning numbers in the vertical direction are different within the plane, and artifacts may be generated in the boundaries with different binning numbers.

SUMMARY

An object of the present invention is to achieve both high speed readout of an image and a highly fine image in a radiation image imaging apparatus.

To achieve at least one of the abovementioned objects, according to an aspect of the present invention, a radiation image imaging apparatus reflecting one aspect of the present invention includes, a plurality of scanning lines and a plurality of signal lines provided intersecting with each other; a plurality of radiation detecting elements positioned two-dimensionally, with the scanning lines connected in a horizontal direction and the signal lines connected in a vertical direction; a switch which is provided for each radiation detecting element, which is in an off state if off voltage is applied to the connected scanning line, which is in an on state if charge generated in the radiation detecting element is accumulated in the radiation detecting element and the on voltage is applied to the connected scanning line, and which releases the charge to the signal line from the radiation detecting element; a scanning driver which applies voltage to the scanning line and which switches between the on voltage and the off voltage; a readout circuit which reads out charge released from the radiation detecting element to obtain the image; and a hardware processor which controls the scanning driver to apply the on voltage to a plurality of adjacent scanning lines at the same time to obtain an image in which a binning number in an extending direction of the signal line is larger than a binning number in an extending direction of the scanning line; and which performs an enlarged interpolation process on the obtained image in an extending direction of the signal line to generate an image in which a pixel size in the extending direction of the signal line matches a pixel size in the extending direction of the scanning line.

According to another aspect of the present invention, a radiation image imaging system reflecting another aspect of the present invention includes, a radiation image imaging apparatus including: a plurality of scanning lines and a plurality of signal lines provided intersecting with each other; a plurality of radiation detecting elements positioned two-dimensionally, with the scanning lines connected in a horizontal direction and the signal lines connected in a vertical direction; a switch which is provided for each radiation detecting element, which is in an off state if off voltage is applied to the connected scanning line, which is in an on state if charge generated in the radiation detecting element is accumulated in the radiation detecting element and the on voltage is applied to the connected scanning line, and which releases the charge to the signal line from the radiation detecting element; a scanning driver which applies voltage to the scanning line and which switches between the on voltage and the off voltage; a readout circuit which reads out charge released from the radiation detecting element to obtain the image; and a hardware processor which controls the scanning driver to apply the on voltage to a plurality of adjacent scanning lines at the same time to obtain an image in which a binning number in an extending direction of the signal line is larger than a binning number in an extending direction of the scanning line; a radiation source which irradiates radiation on the radiation image imaging apparatus; and a console which performs an image process on the image obtained by the radiation image imaging apparatus, wherein, the console performs an enlarged interpolation process on the image obtained from the radiation image imaging apparatus in an extending direction of the signal line to generate an image in which a pixel size in the extending direction of the signal line matches a pixel size in the extending direction of the scanning line.

BRIEF DESCRIPTION OF THE DRAWINGS

The advantages and features provided by one or more embodiments of the invention will become more fully understood from the detailed description given hereinafter and the appended drawings which are given by way of illustration only, and thus are not intended as a definition of the limits of the present invention.

DETAILED DESCRIPTION OF EMBODIMENTS

Hereinafter, one or more embodiments of the radiation imaging system and the radiation image imaging apparatus will be described with reference to the drawings. However, the scope of the invention is not limited to the disclosed embodiments.

The description below describes an indirect type radiation image imaging apparatus which is provided with a scintillator and which converts the irradiated radiation to electromagnetic waves in other wavelengths such as a visible light to obtain an electric signal, but the present invention can also be applied to a direct type radiation image imaging apparatus. The radiation image imaging apparatus is portable, but the present invention can be applied to the radiation image imaging apparatus formed as one with a supporting base.

[Radiation Image Imaging System]

Figure 1:
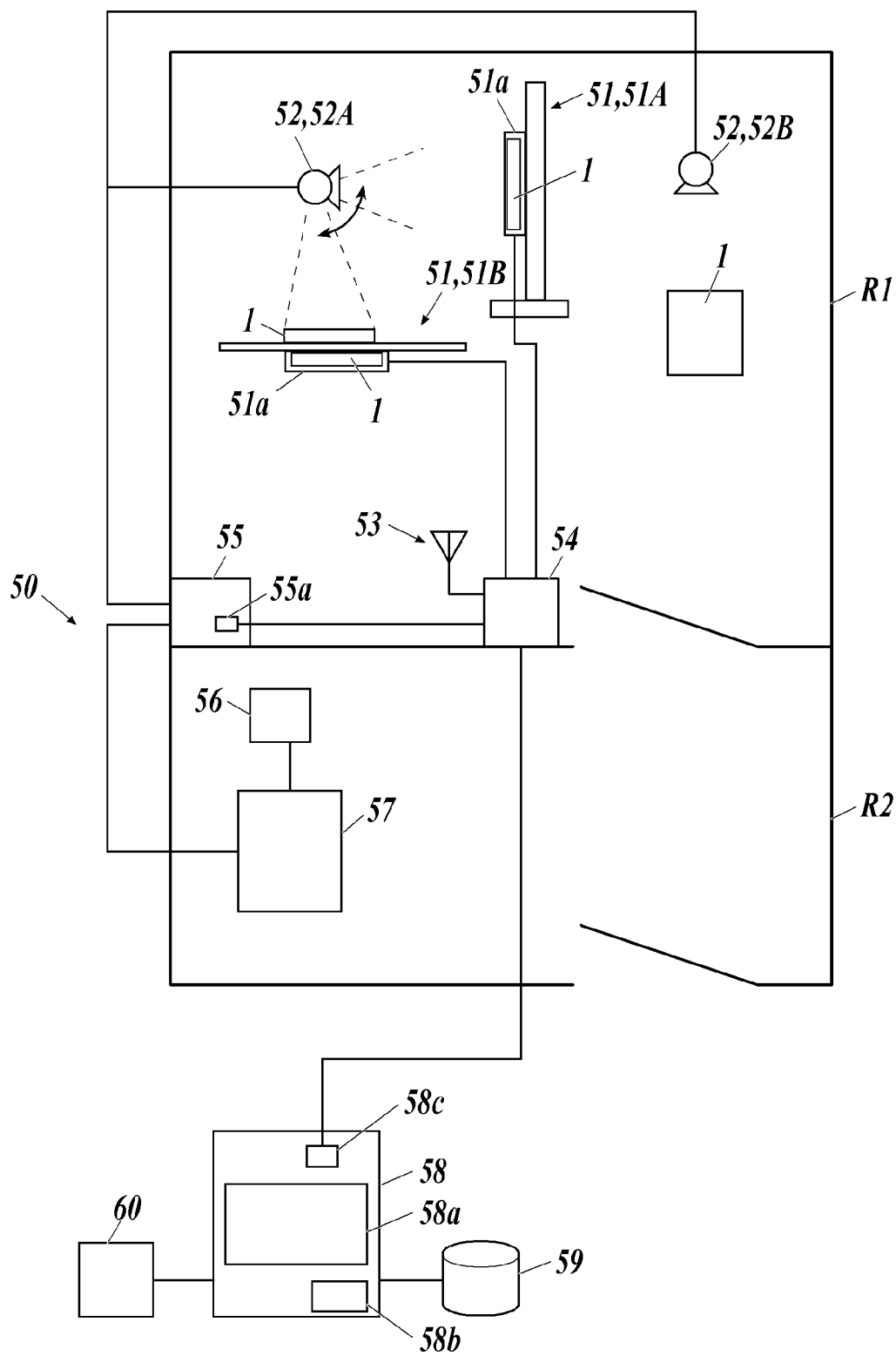
FIG. 1 is a diagram showing an entire configuration of a radiation image imaging system according to a first and second embodiment.

FIG. 1 is a diagram showing an entire configuration of a radiation image imaging system 50 according to the present embodiment.

For example, as shown in FIG. 1, the radiation image imaging system 50 is provided in an imaging room R1 in which radiation is irradiated to image a portion of a body of a patient (not shown) as a subject (imaging target site of patient), a front room R2 which is adjacent to the imaging room R1 and in which various operations are performed such as an operator (user), or a radiation technician for example, controlling the start of irradiating radiation to the subject, and outside the above.

Specifically, as shown in FIG. 1, the radiation image imaging system 50 includes a radiation image imaging apparatus 1 which performs the radiation image imaging process, a console 58 which performs a predetermined image process on image data of a radiation image imaged by the radiation image imaging apparatus 1, and a radiation generating apparatus 55 which irradiates radiation on the radiation image imaging apparatus 1.

For example, the imaging room R1 includes, a bucky apparatus 51 which can be mounted on a radiation image imaging apparatus 1, a radiation source 52 which includes an X-ray tube (not shown) which generates radiation irradiated on the subject and a radiation generating apparatus 55 which controls the radiation source 52, and a relay 54 which includes a wireless antenna 53 to relay communication between the radiation image imaging apparatus 1 and other apparatuses such as a console 58 and a radiation generating apparatus 55.

FIG. 1 shows the portable radiation image imaging apparatus 1 used as follows, mounted in a cassette holder 51a of a bucky apparatus 51, or in a state alone without mounting on a bucky apparatus 51, such as positioning the radiation image imaging apparatus 1 on an upper side of a bucky apparatus 51B for imaging in a lying position and placing the hand of the patient as a subject on a radiation entering surface R (see FIG. 2). Alternatively, the radiation image imaging apparatus 1 can be formed as one with the bucky apparatus 51 or the supporting base.

Here, when the portable radiation image imaging apparatus 1 is used alone without mounting on the bucky apparatus 51, other than placing the radiation image imaging apparatus 1 on the upper side of the bucky apparatus 51B for imaging in a lying position to place the hand of the patient as the subject on the radiation entering surface R, for example, placing the radiation image imaging apparatus 1 on the upper side of a bed provided in the imaging room R1 to place the hand of the patient as the subject on the radiation entering surface R (see FIG. 2) or inserting the radiation image imaging apparatus between the bed and a lower back or a leg of the patient lying on the bed.

The relay 54 is connected to the console 58 and the radiation generating apparatus 55 through a wired connection such as a Local Area Network (LAN) cable. The relay 54 includes a convertor (not shown) which converts a signal for LAN communication to transmit information between the radiation image imaging apparatus 1 and the console 58 to a signal for transmitting the information to the radiation generating apparatus 55, and visa versa.

The relay 54 is connected to the bucky apparatus through a wired connection. The communication between the radiation image capturing apparatus 1 mounted on the bucky apparatus 51 and the other apparatuses such as the console 58 and the radiation generating apparatus 55 can be performed by a wired communication through the relay 54.

FIG. 1 shows the radiation image imaging apparatus 1, specifically, the radiation image imaging apparatus 1 not mounted on the bucky apparatus 51 and the relay 54 connected wirelessly, and the communication between the radiation image imaging apparatus 1 and other apparatuses such as the console 58 and the radiation generating apparatus 55 performed by wireless communication through the relay 54. Alternatively, the radiation image imaging apparatus 1 can be connected to the relay 54 in a wired state, and the communication between the radiation image imaging apparatus 1 and the other apparatuses can be performed by wired communication through the relay 54.

The radiation image imaging apparatus 1 can be connected wirelessly to the relay 54 even when mounted on the bucky apparatus 51.

FIG. 1 shows one bucky apparatus 51A for imaging in a standing position and one bucky apparatus 51B for a lying position as the bucky apparatus 51 provided in the imaging room R1. However, the number and types of bucky apparatuses 51 provided in the imaging room R1 are not limited.

FIG. 1 shows one radiation source 52A corresponding to a bucky apparatus 51 and one portable radiation source 52B provided as the radiation source 52 in the imaging room R1. However, the number and types of radiation sources 52 provided in the imaging room R1 are not limited.

[Radiation Generating Apparatus]

The radiation generating apparatus 55 which irradiates radiation to the radiation image imaging apparatus 1 is provided in the imaging room R1.

According to the present embodiment, an operating table 57 of the radiation generating apparatus 55 is provided in the front room R2 adjacent to the imaging room R1. An exposure switch 56 operated by the user such as a radiation technician to instruct the radiation generating apparatus 55 to start irradiating the radiation is provided in the operating table 57.

The exposure switch 56 is a two level switch including a first switch and a second switch.

If the first switch is pressed, the exposure switch 56 transmits the start signal to the radiation generating apparatus 55 through the operating table 57.

If the start signal is received, the radiation generating apparatus 55 starts rotating an anode of the X-ray tube in the radiation source 52 so that the radiation source 52 is in a standby state. A pressing notifying signal of the first switch is transmitted to the radiation image imaging apparatus 1 through the relay 54.

If the second switch is pressed, the exposure switch 56 transmits the radiation irradiating start signal to the radiation generating apparatus 55 through the operating table 57.

If the radiation generating apparatus 55 receives the radiation irradiating start signal from the exposure switch 56, the pressing notifying signal of the second switch is transmitted to the radiation image imaging apparatus 1 through the relay 54. If the pressing notifying signal of the second switch is received and the preparations such as reset completing are ready, the radiation image imaging apparatus 1 transmits an interlock release signal to the radiation generating apparatus 55 through the relay 54. If the radiation generating apparatus 55 receives the interlock release signal transmitted through the relay 54 from the radiation image imaging apparatus 1, the radiation is irradiated from the X-ray tube of the radiation source 52.

The radiation generating apparatus 55 is configured so that various control can be performed on the radiation source 52. For example, the user operates the operating table 57 to adjust the position and the radiation irradiating direction of the radiation source 52 so that the radiation is suitably irradiated to the radiation image imaging apparatus 1, to adjust the diaphragm of the radiation source 52 so that the radiation is irradiated in the predetermined region of the radiation image imaging apparatus 1, and to adjust the radiation source 52 so that a suitable amount of radiation is irradiated. The above processes can be performed manually by the user.

[Console]

For example, as shown in FIG. 1, the console 58 is a computer including a display 58 including a CRT (Cathode Ray Tube) or LCD (Liquid Crystal Display), etc., a storage 59 including an HDD (Hard Disk Drive), a controller 58b which controls operation of each unit of the console 58, a communicating unit 58c which is connected to the relay 54 through a LAN cable and which communicates with other apparatuses such as the radiation image imaging apparatus 1, and an input unit 60 including a keyboard and a mouse.

FIG. 1 shows the console 58 provided outside the imaging room R1 and the front room R2, but alternatively, the console 58 can be provided in the front room R2.

FIG. 1 shows the storage 59 connected to the console 58, but alternatively, the storage 59 can be included in the console 58.

If the communicating unit 58c receives the image data of the radiation image obtained by the radiation image imaging apparatus 1 from the radiation image imaging apparatus 1 through the relay 54, the controller 58b of the console 58 performs a predetermined image process such as an enlarged interpolation process on the received radiation image and stores the image in the storage 59.

Then, according to the instruction input by the user operating the input unit 60, the controller 58b of the console 58 displays the received radiation image on the display 58a or outputs the image from the communicating unit 58c to be transmitted to other apparatuses (not shown) such as an imager or data management server.

[Radiation Image Imaging Apparatus]

Figure 2:
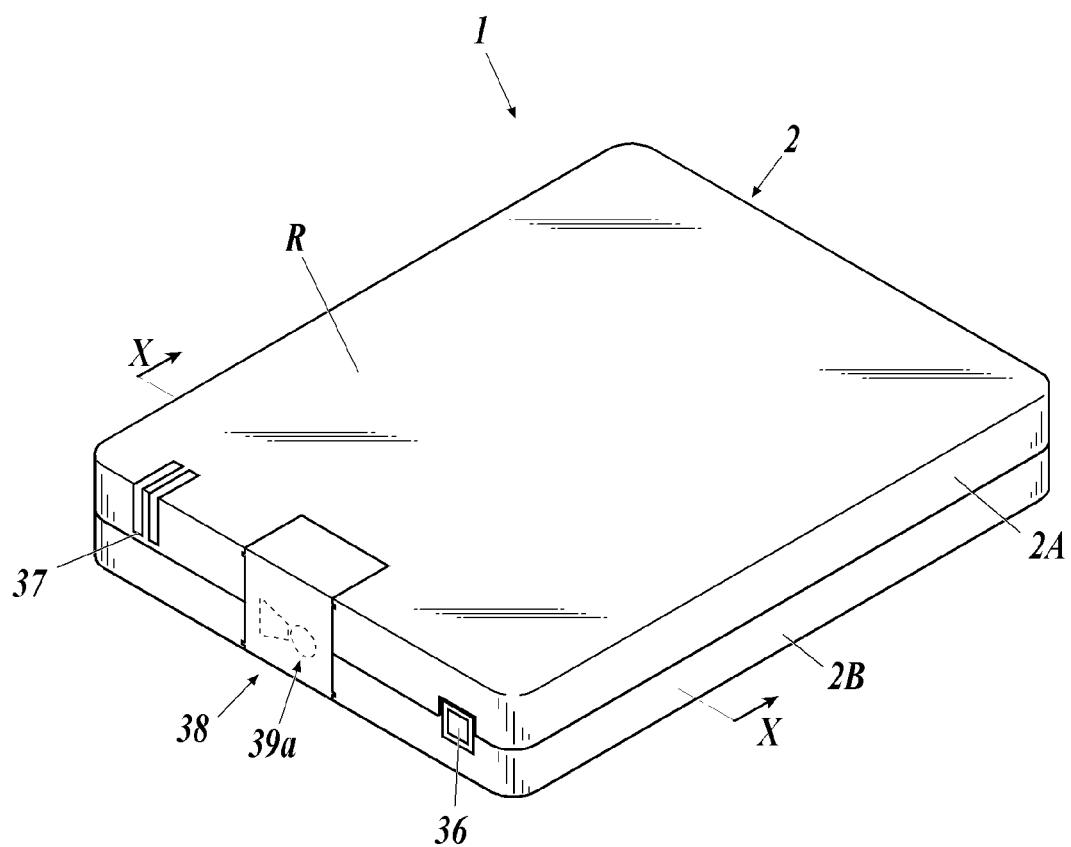
FIG. 2 is a perspective view showing a radiation image imaging apparatus according to the present embodiment.
Figure 3:
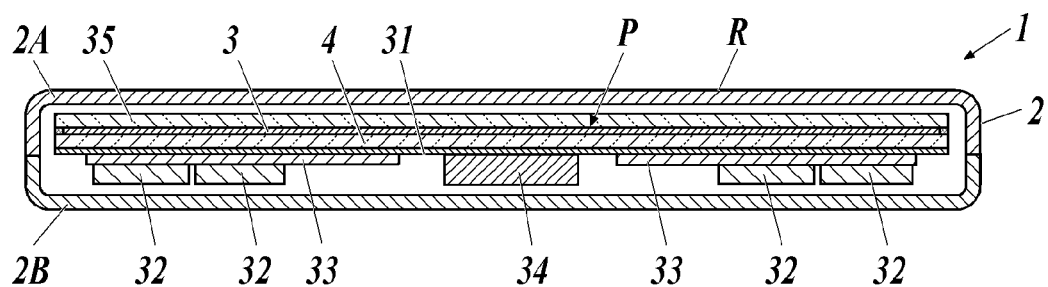
FIG. 3 is a cross-sectional view along a X-X line shown in FIG. 2.

FIG. 2 is an external perspective view of the radiation image imaging apparatus according to the present embodiment, and FIG. 3 is a cross-sectional view along line X-X shown in FIG. 2.

As shown in FIG. 2 and FIG. 3, the radiation image imaging apparatus 1 according to the present embodiment is a portable (cassette type) apparatus including a scintillator 3 and a substrate 4 in a case 2.

In the case 2, at least a surface R (hereinafter referred to as "radiation entering surface R") which receives the irradiation of radiation is formed from material which transmits radiation. Such material includes a carbon plate or plastic.

FIG. 2 and FIG. 3 show a case 2 in a box shape formed from a frame plate 2A and a back plate 2B, but the case 2 may also be a monocoque type formed as one in a rectangular tube shape.

As shown in FIG. 2, according to the present embodiment, a power switch 36, an indicator 37 including an LED, a cover member 38 which can be opened and closed to exchange the battery 41 (see later described FIG. 6) are provided on the side portion of the case 2. According to the present embodiment, an antenna 39a is embedded in the side of the cover 38.

As shown in FIG. 3, a base 31 is positioned inside the case 2 on the bottom side of the substrate 4 with a lead thin plate (not shown), etc. in between. A PCB substrate 33 with electronic components 32 and a cushioning 34 are attached to the base 31. According to the present embodiment, a glass substrate 35 is provided on the substrate 4 and on the radiation entering surface R side of the scintillator 3 for protection.

The scintillator 3 is positioned facing the later described detector P of the substrate 4. For example, the main component of the scintillator 3 is a phosphor, and this converts the entering radiation to an electromagnetic wave with a wavelength of 300 to 800 nm, that is, an electromagnetic wave mainly of visible light. With this, the result is output.

Figure 4:
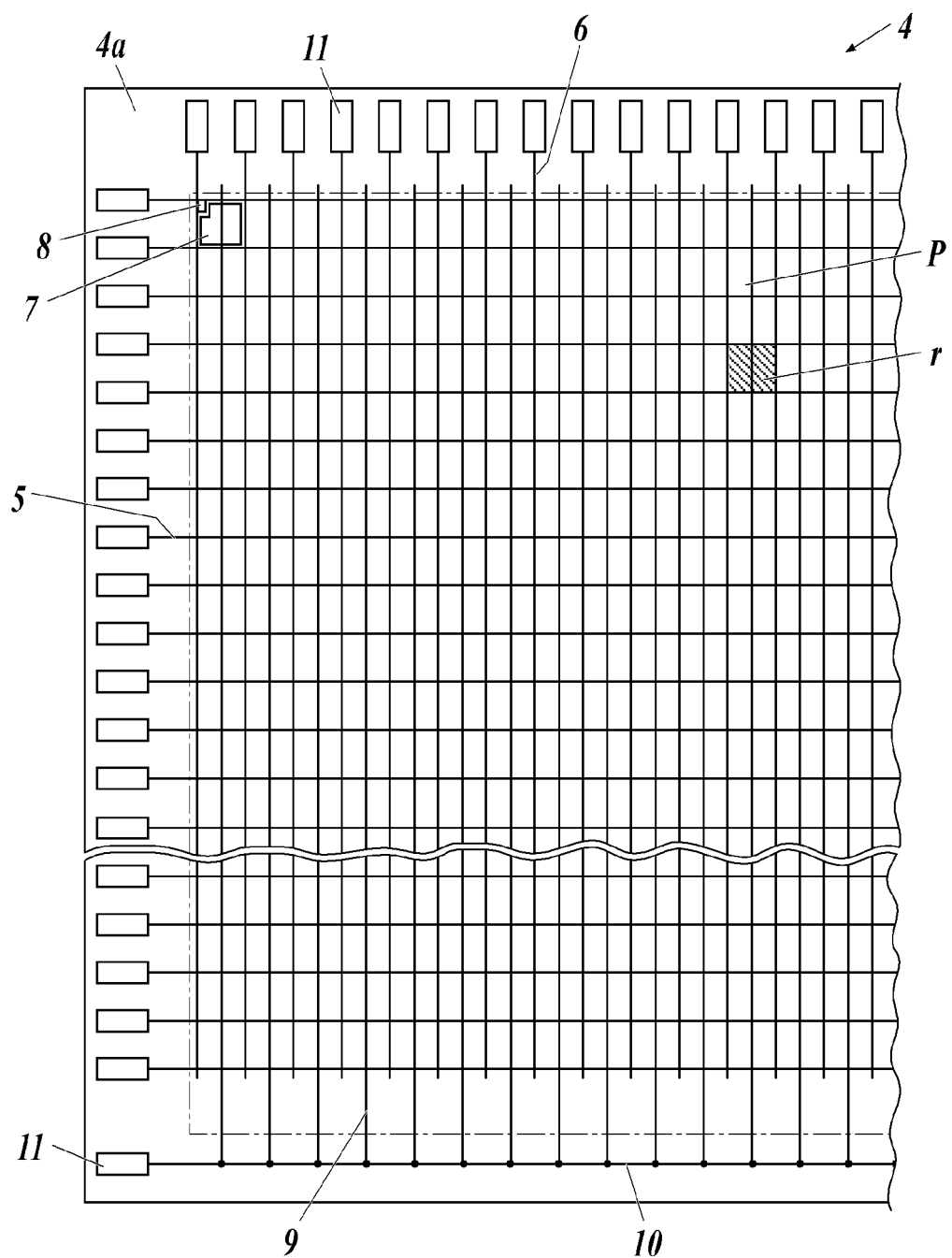
FIG. 4 is a planar view showing a configuration of a substrate of a radiation image imaging apparatus.

According to the present embodiment, the substrate 4 includes a glass substrate, and as shown in FIG. 4, a plurality of scanning lines 5 and a plurality of signal lines 6 are provided intersecting with each other on the surface 4a of the substrate 4 on the side facing the scintillator 3. The radiation detecting element 7 is provided in each region r divided by the plurality of scanning lines 5 and the plurality of signal lines 6 on the surface 4a of the substrate 4.

As described above, all of the regions r in which the plurality of radiation detecting elements 7 are provided two-dimensionally in each region r divided by the scanning line 5 and the signal line 6, that is, the region shown with a long and short dash line FIG. 4 is the detector P. The scanning lines 5 are connected in the horizontal direction of the plurality of radiation detecting elements 7 provided two-dimensionally and the signal lines 6 are connected in the vertical direction.

According to the present embodiment, the radiation detecting element 7 is used as the photodiode, and other than the above, a phototransistor, for example, can be used.

Figure 5:
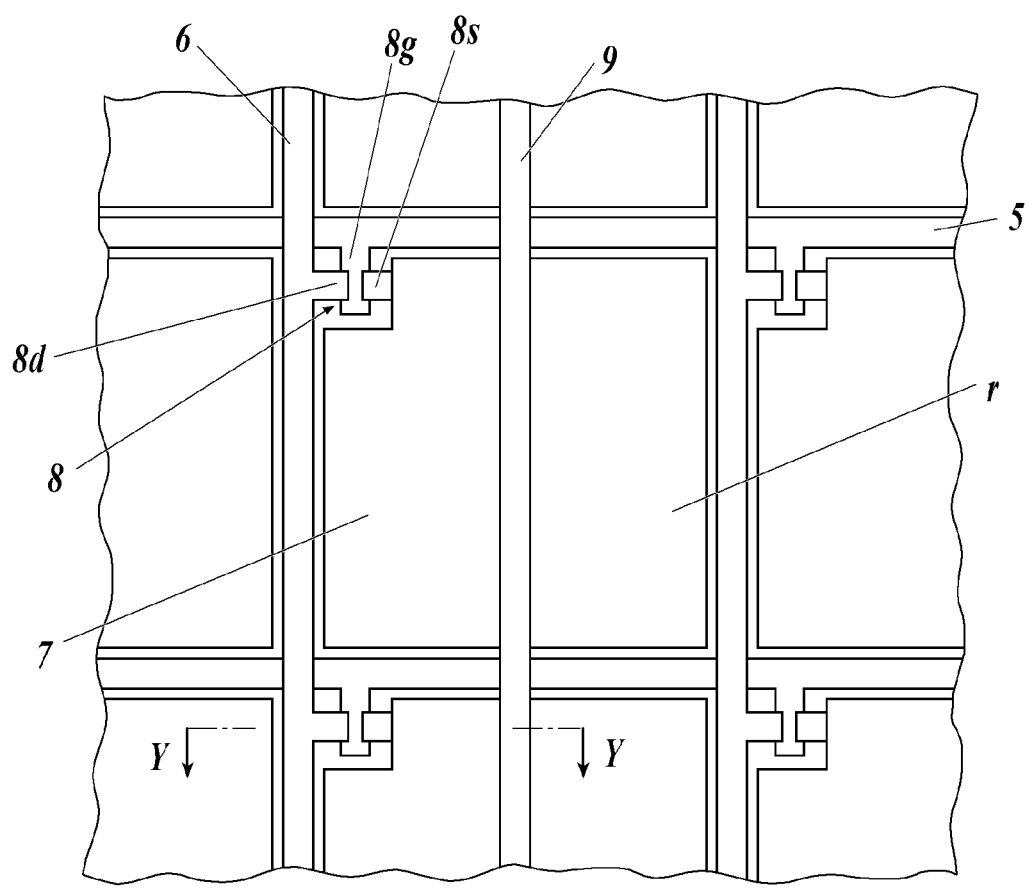
FIG. 5 is an enlarged diagram showing a configuration of a radiation detecting element and a TFT formed in a small region on a substrate shown in FIG. 4.

As shown in FIG. 4 and FIG. 5 which is the enlarged diagram of FIG. 4, each radiation detecting element 7 is connected to the source electrode 8s of the TFT 8 which is the switch. The drain electrode 8d of the TFT 8 is connected to the signal line 6.

If the later described scanning driver 15 applies an on voltage to the connected scanning line 5 and the on voltage is applied to the gate electrode 8g through the scanning line 5, the TFT 8 is in the on state, and the charge accumulated in the radiation detecting element 7 is released from the radiation detecting element 7 to the signal line 6.

If an off voltage is applied to the connected scanning line 5 and the off voltage is applied to the gate electrode 8g through the scanning line 5, the TFT 8 is in the off state. With this, the release of the charge from the radiation detecting element 7 to the signal line 6 stops and the charge generated in the radiation detecting element 7 is held and accumulated in the radiation detecting element 7.

Figure 6:
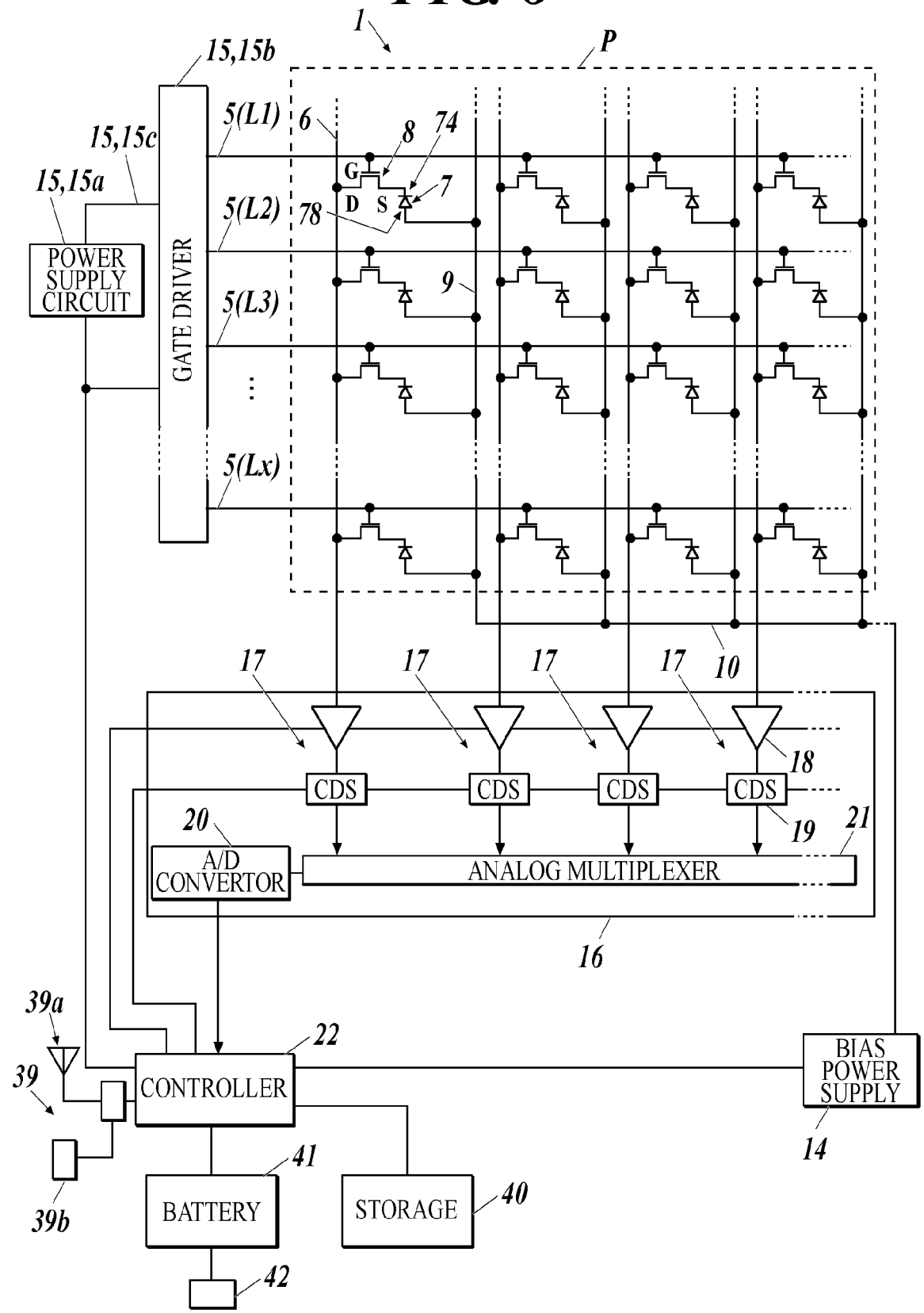
FIG. 6 is a block diagram showing an equivalent circuit of a radiation image imaging apparatus.
Figure 7:
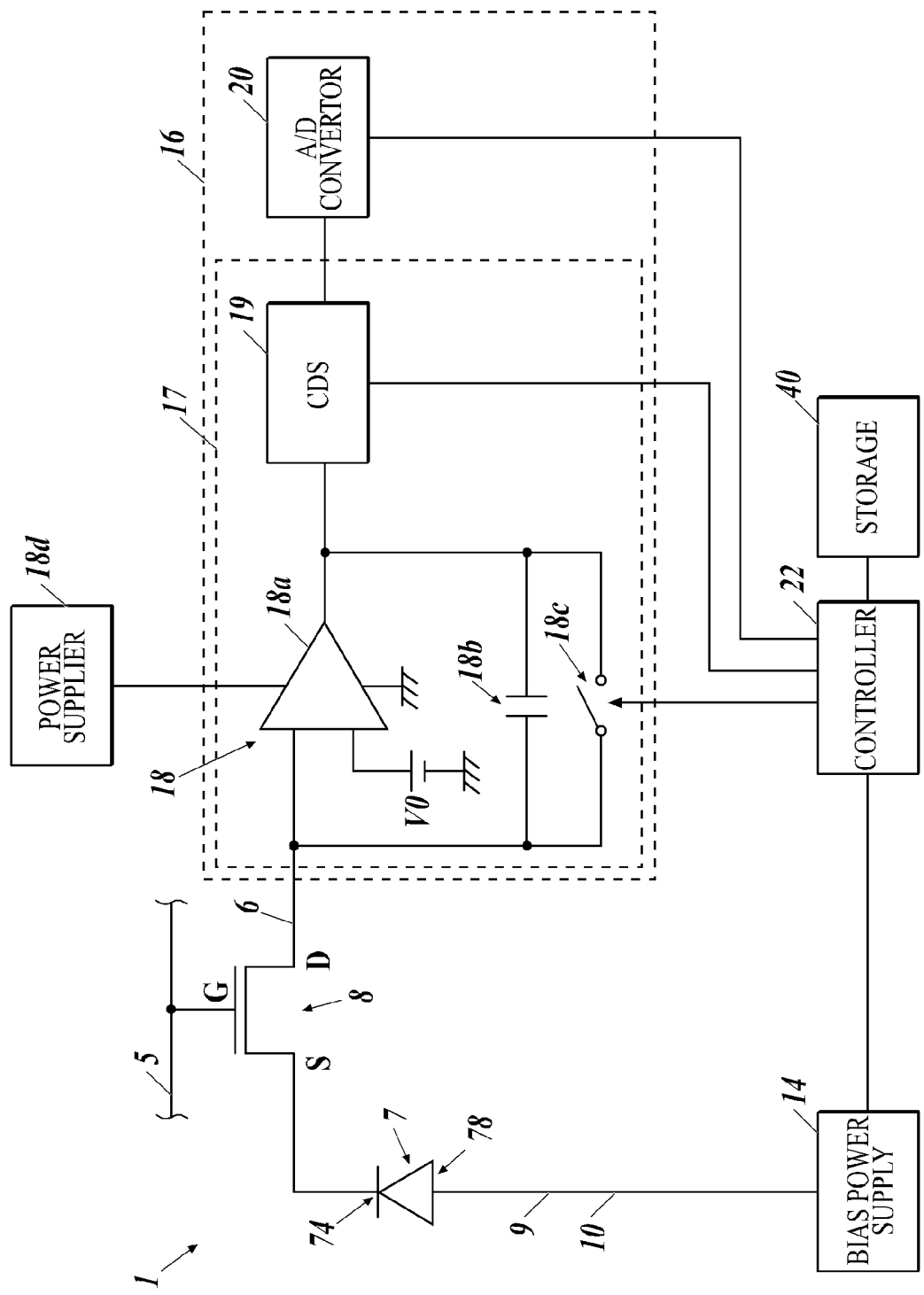
FIG. 7 is a block diagram showing an equivalent circuit of one pixel composing a detector.

Here, the circuit configuration of the radiation image imaging apparatus 1 is described. FIG. 6 is a block diagram showing an equivalent circuit of the radiation image imaging apparatus 1 according to the present embodiment. FIG. 7 is a block diagram showing the equivalent circuit for one pixel composing the detector P.

A bias line 9 is connected to a second electrode 78 in each radiation detecting element 7 of the detector P in the substrate 4. The bias lines 9 are united by the binding line 10, and connected to the bias power supply 14. The bias power supply 14 applies the bias voltage to the second electrode 78 of each radiation detecting element 7 through the binding line 10 and the bias lines 9.

The bias power supply 14 is connected to the later described controller 22, and the controller 22 controls the bias voltage applied to each radiation detecting element 7 from the bias power supply 14.

According to the present embodiment, the bias power supply 14 applies to the second electrode 78 of the radiation detecting element 7 through the bias line 9 the voltage which is equal to or less than the voltage on the first electrode 74 side of the radiation detecting element 7 (that is, reverse bias voltage) as the bias voltage.

The first electrode 74 in each radiation detecting element 7 is connected to the source electrode 8s of the TFT 8 (shown with S in FIG. 6 and FIG. 7), and the gate electrode 8g in each TFT 8 (shown with G in FIG. 6 and FIG. 7) is connected to each line L1 to Lx of the scanning lines 5 extending from the gate driver 15b of the later described scanning driver 15. The drain electrode 8d in each TFT 8 (shown with D in FIG. 6 and FIG. 7) is connected to each signal line 6.

The scanning driver 15 includes a power supply circuit 15a which supplies the on voltage and the off voltage to the gate driver 15b through wires 15c, and the gate driver 15b which switches the voltage applied to each line L1 to Lx of the scanning lines 5 between the on voltage and the off voltage to switch each TFT 8 between the on state and the off state.

As shown in FIG. 6 and FIG. 7, each signal line 6 is connected to each readout circuit 17 formed in the readout IC 16. According to the present embodiment, one readout circuit 17 is provided for one signal line 6 in the readout IC 16.

The readout circuit 17 includes an amplifying circuit 18 and a correlated double sampling circuit 19. The readout IC 16 includes an analog multiplexer 21 and an A/D convertor 20. In FIG. 6 and FIG. 7 the correlated double sampling circuit 19 is shown with CD S. The analog multiplexer 21 is omitted in FIG. 7.

According to the present embodiment, the amplifying circuit 18 includes a charge amplifying circuit. The amplifying circuit 18 includes an operational amplifier 18a, and a capacitor 18b and a charge reset switch 18c connected parallel to the operational amplifier 18a. A power supplier 18d to supply power to the amplifying circuit 18 is connected to the amplifying circuit 18.

A signal line 6 is connected to the inverted input terminal on the input side of the operational amplifier 18a of the amplifying circuit 18, and a reference potential V0 is applied to the non-inverted input terminal on the input side of the amplifying circuit 18. The reference potential V0 is set to a suitable value, and according to the present embodiment, for example, 0 [V] is applied.

The charge reset switch 18c of the amplifying circuit 18 is connected to the controller 22 and the on and off are controlled with the controller 22.

If the TFT 8 is in the on state when the charge reset switch 18c is in the off state (that is, when the on voltage is applied to the gate electrode 8g of the TFT 8 through the scanning line 5), the accumulated charge is released to the signal line 6 from each radiation detecting element 7 through each TFT 8 in the on state. The charge flows through the signal line 6, and flows into and accumulates in the capacitor 18b of the amplifying circuit 18.

Then, in the amplifying circuit 18, the voltage value according to the charge amount accumulated in the capacitor 18b is output from the output side of the operational amplifier 18a. With this, the amplifying circuit 18 outputs the voltage value according to the charge amount output from each radiation detecting element 7 and performs charge/voltage conversion.

If the charge reset switch 18c is on when the amplifying circuit 18 is reset, a short circuit occurs in the input side and the output side of the amplifying circuit 18, and the charge accumulated in the capacitor 18b is discharged. Then, the discharged charge passes the operational amplifier 18a from the output terminal side of the operational amplifier 18a, and comes out from the non-inverted input terminal and is earthed, or flows out to the power supplier 18d. With this, the amplifying circuit 18 is reset.

The amplifying circuit 18 may be configured to output the electric current according to the charge output from the radiation detecting element 7.

The correlated double sampling circuit (CD S) 19 is connected on the output side of the amplifying circuit 18. The correlated double sampling circuit 19 includes a sample hold function according to the present embodiment. The on and off of the sample hold function in the correlated double sampling circuit 19 is controlled by the pulse signal transmitted from the controller 22.

In the readout process of the image data from the radiation detecting element 7, the controller 22 controls the amplifying circuit 18 and the correlated double sampling circuit 19 to perform charge/voltage conversion of the charge released from each radiation detecting element 7 in the amplifying circuit 18, and to sample the voltage value on which the charge/voltage conversion is performed in the correlated double sampling circuit 19. The result is output to the downstream side as image data.

The image data of each radiation detecting element 7 output from the correlated double sampling circuit 19 is transmitted to the analog multiplexer 21 and is sequentially transmitted from the analog multiplexer 21 to the A/D convertor 20. Then, the image data is sequentially converted to image data with a digital value in the A/D convertor 20. The image data is output in the storage 40 and sequentially stored.

As described below, the controller 22 sequentially switches each line L1 to Lx of the scanning line 5 on which the on voltage is applied from the gate driver 15b of the scanning driver 15, and each time the line is switched, the image data readout process to readout the image data from each radiation detecting element 7 is performed.

The controller 22 includes a computer including a CPU (Central Processing Unit), a ROM (Read Only Memory), a RAM (Random Access Memory), and an input/output interface connected by a bus, and a FPGA (Field Programmable Gate Array). A dedicated control circuit can also be used. The controller 22 controls the operation of each unit in the radiation image imaging apparatus 1.

As shown in FIG. 6, a storage 40 including a DRAM (Dynamic RAM) is connected to the controller 22.

According to the present embodiment, the communicating unit 39 is connected to the controller 22. The communicating unit 39 transmits and receives the data and the signal with outside devices using wireless communication or wired communication through the antenna 39a and the connector 39b.

According to the present embodiment, a battery 41 which supplies power to each functional unit such as the detector P, the scanning driver 15, the readout circuit 17, the storage 40, and the bias power supply 14 is connected to the controller 22. A connecting terminal 42 is attached to the battery 41 to connect the battery 41 to the charging apparatus when power is supplied from the charging apparatus (not shown) to the battery 41 when the battery 41 is charged.

The controller 22 controls the operation of each functional unit of the radiation image imaging apparatus 1, for example, controls the bias power supply 14 to set the bias voltage applied to each radiation detecting element 7 from the bias power supply 14, controls the on/off of the charge reset switch 18c in the amplifying circuit 18 of the readout circuit 17, and transmits the pulse signal to the correlated double sampling circuit 19 to control the on/off of the sample hold function.

If the pressing notifying signal of the first switch of the exposure switch 56 is received from the radiation generating apparatus 55, the controller 22 controls each unit and performs the process of the radiation image imaging apparatus 1 side in the moving image obtaining sequence described later.

<Operation of Radiation Image Imaging System>

The operation of the radiation image imaging system 50 is described below.

The present embodiment describes imaging in a moving image imaging mode. The moving image imaging here is to successively obtain a plurality of images in response to one imaging operation (one operation of the first switch and the second switch of the exposure switch 56). That is, the radiation source 52 repeatedly irradiates the subject with the radiation such as the X-ray pulsed in a predetermined interval (pulse irradiation) or the radiation is irradiated on the subject in a low amount continuously without pausing (continuous irradiation). The radiation image imaging apparatus 1 synchronizes with the radiation source 52 to accumulate and readout the charge in a predetermined interval. With this, the plurality of radiation images are obtained. The string of radiation images obtained by moving image imaging is called a moving image. Each of the plurality of radiation images included in the moving image is called a frame image. In the present embodiment, imaging the moving image by pulse irradiation is described as one example.

The person performing the imaging prepares for the imaging. For example, the user selects an imaging menu (for example, imaging mode (here, moving image imaging mode), imaging site, imaging direction, etc.) through the input unit 60 on the console 58, and inputs the instruction to start imaging. The person performing the imaging positions the subject, the radiation source 52, and the radiation image imaging apparatus 1.

In the console 58, the imaging menu is selected with the input unit 60. If the imaging start instruction is input, the controller 58b transmits the imaging start instruction on the selected imaging menu to the radiation generating apparatus 55 and the radiation image imaging apparatus 1 by the communicating unit 58c. If the imaging menu is received, the radiation generating apparatus 55 sets the radiation irradiating condition according to the imaging menu. If the imaging menu is received, the controller 22 of the radiation image imaging apparatus 1 reads the image obtaining condition according to the imaging menu from the storage 40 and sets the condition.

The radiation irradiating condition and the image obtaining condition according to the imaging menu is stored in the storage 59, and the radiation imaging condition and the image obtaining condition are transmitted and set from the console 58 to the radiation generating apparatus 55 and the radiation image imaging apparatus 1.

Here, the radiation irradiating condition in the moving image imaging mode includes, a pulse rate, pulse width, pulse interval, tube voltage, tube current, and frame number.

The image obtaining condition in the moving image imaging mode includes a frame rate, accumulating time, charge readout time, binning number, and frame number. According to the moving image imaging mode of the present embodiment, a binning number in the vertical direction>a binning number in the horizontal direction. For example, the binning number in the vertical direction=2 and the binning number in the horizontal direction=1. According to the description below, the binning number in the vertical direction=2 and the binning number in the horizontal direction=1. As described above, according to the present application, the vertical direction is an extending direction of the signal line 6. The binning in the vertical direction is performed by turning on the gate electrode 8g in a plurality of adjacent lines at the same time. The binning in the horizontal direction is an extending direction of the scanning line 5. The binning in the horizontal direction is performed by adding or averaging values in a plurality of adjacent pixels in the horizontal direction of the image data.

If the preparations for imaging are complete, the person performing the imaging presses the first switch of the exposure switch 56, and then presses the second switch. If the first switch is pressed, the exposure switch 56 transmits a start signal to the radiation generating apparatus 55 through the operating table 57. If the start signal is received, the radiation generating apparatus 55 starts rotating the anode of the X-ray tube of the radiation source 52 to set the radiation source 52 to standby. The pressing notifying signal of the first switch is transmitted to the radiation image imaging apparatus 1 through the relay 54.

If the pressing notifying signal of the first switch is received by the communicating unit 39, the controller 22 of the radiation image imaging apparatus 1 sequentially applies on voltage to each line L1 to Lx of the scanning line 5 from the gate driver 15b of the scanning driver 15, and releases the charge remaining in the radiation detecting element 7 to the signal line 6 to perform the reset process of the radiation detecting element 7 which removes the charge in the radiation detecting element 7.

If the second switch is pressed, the exposure switch 56 transmits the radiation irradiating start signal to the radiation generating apparatus 55 through the operating unit 57.

If the radiation irradiating start signal is received from the exposure switch 56, the radiation generating apparatus 55 transmits the pressing notifying signal of the second switch to the radiation image imaging apparatus 1 through the relay 54. If the pressing notifying signal of the second switch is received and preparation such as completing reset is finished, the radiation image imaging apparatus 1 transmits an interlock release signal to the radiation generating apparatus 55 through the relay 54, and performs the later-described moving image obtaining sequence. If the interlock release signal transmitted through the relay 54 from the radiation image imaging apparatus 1 is received, the radiation generating apparatus 55 irradiates radiation from the X-ray tube of the radiation source 52 based on the radiation irradiating condition.

Figure 8:
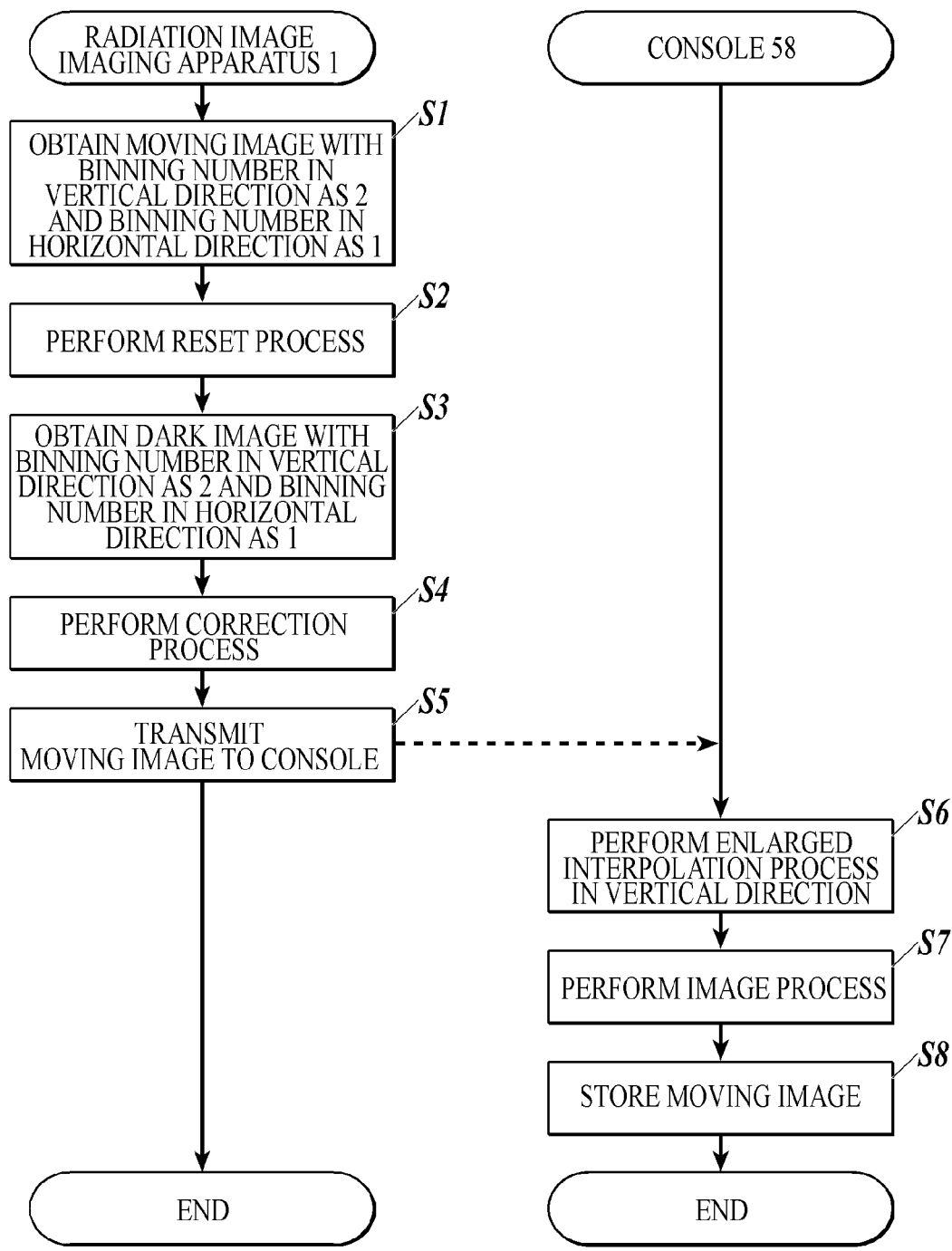
FIG. 8 is a diagram showing a flow of a moving image obtaining sequence.

FIG. 8 is a flowchart showing a flow of a moving image obtaining sequence performed by the radiation image imaging apparatus 1 and the console 58 in response to pressing the second switch. The process on the radiation image imaging apparatus 1 side of the moving image obtaining sequence is performed by the controller 22. The process on the console 58 side is performed by the controller 58b. The moving image obtaining sequence is described.

First, the controller 22 obtains the moving image with the binning number in the vertical direction as 2 and the binning number in the horizontal direction as 1 (step S1).

In step S1, the controller 22 applies the off voltage to all of the scanning lines 5 using the scanning driver 15 to progress to the charge accumulating mode to accumulate charge in the radiation detecting element 7. If the predetermined accumulating time passes, the controller 22 applies on voltage to two adjacent lines at a time from the line L1 to the line Lx direction using the gate driver 15b of the scanning driver 15, and releases the charge in the radiation detecting element 7 for two lines at the same time. Then, the process progresses to the readout mode which converts the released charge to the image data with the readout circuit 17. With this, the vertical direction obtains the radiation image on which the binning is performed with the binning number 2. The controller 22 repeats the charge accumulating mode and the readout mode a predetermined number of times based on the image obtaining condition. The image data of the obtained frame images is stored in the storage 40 corresponded with the frame number.

As described above, the moving image is obtained with the binning number in the vertical direction as 2 and the binning number in the horizontal direction as 1, the charge readout time (readout mode time) can be made short and the image readout at a high speed (image obtaining at a high frame rate) is possible. Since the binning is not performed in the horizontal direction, the resolution does not decrease in the horizontal direction and the image can be obtained at a high frame rate.

The charge accumulating mode and the readout mode are repeated a plurality of amount of times and when the obtaining of the string of frame images in the moving image ends, the controller 22 performs the reset process (step 2).

Next, the controller 22 obtains a dark image with the binning number in the vertical direction as 2 and the binning number in the horizontal direction as 1 (step S3). That is, the controller 22 applies off voltage to all of the scanning lines 5 with the scanning driver 15 in a state in which the radiation is not irradiated to the radiation image imaging apparatus 1, and progresses the process to the charge accumulating mode in which the charge is accumulated in the radiation detecting element 7. If the predetermined accumulating time passes, the controller 22 applies the on voltage to two adjacent lines at a time in the line L1 to line Lx direction of the scanning line 5 using the gate driver 15b of the scanning driver 15. The charge of radiation detecting elements 7 for two lines is released at the same time, and the released charge is converted to the image data using the readout circuit 17. With this, the dark image is obtained.

Only one dark image may be obtained or a plurality of dark images can be obtained and then averaged. When the dark image is obtained also, the moving image is obtained with the binning number in the vertical direction as 2 and the binning number in the horizontal direction as 1. With this, the charge readout time (readout mode time) can be made shorter and the high speed image readout (image obtaining at a high frame rate) is possible.

Next, the controller 22 performs correction processes such as the offset correction process using the dark image obtained in step S3, the gain correction process, the defective pixel correction process and the lag (after image) correction process on the frame images of the moving image obtained in step S1 (step S4). The corrected moving image is transmitted to the console 58 using the communicating unit 39 (step S5).

In the console 58, if the frame images of the moving image are received from the radiation image imaging apparatus 1 using the communicating unit 58c, the communicating unit 58b performs the enlarged interpolation process in the vertical direction of each frame image (direction of the pixel aligned in the extending direction of the signal line 6 in the radiation image imaging apparatus 1 (step S6)).

The enlarged interpolation process is a process which obtains a profile of the pixel value in the direction of the interpolated pixel, performs linear interpolation of the pixel among the profiles, and performs interpolation by an interpolation process such as bicubic. In step S6, enlarged interpolation is performed on the frame image in which the binning number is 2×1 in the vertical direction×horizontal direction to be 1×1, and the pixel size in the vertical direction is matched to the pixel size in the horizontal direction. With this, the moving image is generated with the same resolution as when the binning is not performed.

As in the present embodiment, preferably, the enlarged interpolation process is performed after transfer of the image data from the radiation image imaging apparatus 1 to the console 58. This is because the amount of data transferred from the radiation image imaging apparatus 1 to the console 58 can be decreased than when the enlarged interpolation process is performed in the radiation image imaging apparatus 1. Alternatively, the image data can be transferred from the radiation image imaging apparatus 1 to the console 58 after the enlarged interpolation process is performed in the radiation image imaging apparatus 1 (same can be said for the third embodiment).

Next, the controller 58b performs an image process such as a gradation process or a frequency emphasizing process on each frame image on which the enlarged interpolation is performed (step S7).

Then, each frame image of the processed moving image is corresponded with the patient information or the imaging condition and stored in the storage 59 (step S8). With this, the moving image obtaining sequence ends.

As described above, according to the above-described moving image obtaining sequence, the readout of the moving image is performed with the binning number in the vertical direction as 2 and the binning number in the horizontal direction as 1. With this, the charge readout time (readout mode time) can be made shorter and the image readout at a high speed (image obtaining at a high frame rate) becomes possible. Since the binning is not performed in the horizontal direction, the image can be obtained at a high frame rate without decreasing the resolution in the horizontal direction. Further, enlarged interpolation is performed on the pixel in the vertical direction, and the image can be obtained with the same resolution as when the binning is not performed in the vertical direction. That is, both the readout of the image at a high speed and obtaining the highly fine image can be achieved in the radiation image imaging apparatus.

If the gate driver 15b of the scanning driver 15 applies the on voltage to the scanning line 5 and the readout of the charge from the radiation detecting element 7 is performed, the noise from horizontal pull (line noise) may be generated. Since such noise occurs each time readout is performed, by performing readout of two lines at the same time, the readout signal is twice the amount but the amount of noise is for one readout. With this, the SN ratio can be larger and the influence of the noise from horizontal pull can be decreased.

If the reduction of noise is more important than the fineness of the image, the digital binning process can be performed in the horizontal direction also to generate the moving image with the binning number in the vertical direction×the binning number in the horizontal direction as 2×2.

Second Embodiment

The second embodiment is described below.

The first embodiment describes imaging in the moving image imaging mode, but the second embodiment describes imaging in a Dual Energy Subtraction (DES) mode. In DES, imaging is performed twice with a different tube voltage in response to one imaging operation (one operation of the first switch and the second switch of the exposure switch 56), logarithmic conversion is performed on each of the two obtained images (first tube voltage image, second tube voltage image), and then a coefficient is multiplied and subtraction is performed. With this, a difference image is obtained.

The configuration of the radiation image imaging system 50 according to the second embodiment is similar to the first embodiment and the description is to be referred. The operation of the radiation image imaging system 50 according to the second embodiment is described.

First, the person who performs the imaging prepares for the imaging. For example, the person who performs the imaging selects the imaging menu (for example, imaging mode (here DES mode), imaging site, and imaging direction) through the input unit 60 on the console 58 and inputs the imaging start instruction. The person who performs the imaging positions the subject, the radiation source 52, and the radiation image imaging apparatus 1.

In the console 58, if the imaging menu is selected on the input unit 60, the controller 58b transmits the imaging start instruction for the selected imaging menu to the radiation generating apparatus 55 and the radiation image imaging apparatus 1 using the communicating unit 58c. If the imaging menu is received, the radiation generating apparatus 55 sets the radiation irradiating condition according to the imaging menu. If the imaging menu is received, the controller 22 of the radiation image imaging apparatus 1 reads out the image obtaining condition according to the imaging menu from the storage 40 and sets the condition.

The radiation irradiating condition and the image obtaining condition according to the imaging menu are stored in the storage 59. The radiation irradiating condition and the image obtaining condition according to the imaging menu selected on the console 58 are read out from the storage 59, and the radiation imaging condition and the image obtaining condition are transmitted and set in the radiation generating apparatus 55 and the radiation image imaging apparatus 1.

Here, the radiation irradiating condition in the DES mode includes, a first tube voltage, a tube current, and radiation irradiating time to image a first tube voltage image, a second tube voltage, tube current and radiation irradiating time to image a second tube voltage image (first tube voltage<second tube voltage), and radiation irradiating interval of first tube voltage image and second tube voltage image. Preferably, the radiation irradiating interval is short to suppress the body movement of the subject in the two images. According to the present embodiment, the value is set at about 150 ms to 200 ms.

The image obtaining condition in the DES mode includes, the accumulating time, the charge readout time and the binning number to image the first tube voltage image, and accumulating time, charge readout time, and binning number to obtain the second tube voltage image. In the DES mode according to the present embodiment, the binning number to obtain the first tube voltage image=the binning number to obtain the second tube voltage image and the binning number in the vertical direction>the binning number in the horizontal direction. For example, the binning number in the vertical direction=2, and the binning number in the horizontal direction=1. In the description below, the binning number in the vertical direction=2, and the binning number in the horizontal direction=1.

If the preparation for imaging is complete, the person who performs the imaging presses the first switch of the exposure switch 56, and then presses the second switch. If the first switch is pressed, the exposure switch 56 transmits the start signal to the radiation generating apparatus 55 through the operating table 57. If the start signal is received, the radiation generating apparatus 55 starts the rotation of the anode in the X-ray tube of the radiation source 52, and sets the radiation source 52 to standby. The pressing notifying signal of the first switch is transmitted to the radiation image imaging apparatus 1 through the relay 54.

If the pressing notifying signal of the first switch is received by the communicating unit 39, the controller 22 of the radiation image imaging apparatus 1 sequentially applies the on voltage to each line L1 to line Lx of the scanning lines 5 using the gate driver 15 of the scanning driver 15. The charge remaining in the radiation detecting element 7 is released to the signal line 6. With this, the reset process of the radiation detecting element 7 to remove the charge from the radiation detecting element 7 is performed.

If the second switch is pressed, the exposure switch 56 transmits the radiation irradiating start signal to the radiation generating apparatus 55 through the operating table 57.

If the radiation irradiating start signal from the exposure switch 56 is received, the radiation generating apparatus 55 transmits the pressing notifying signal of the second switch to the radiation image imaging apparatus 1 through the relay 54. If the pressing notifying signal of the second switch is received, and the preparation is completed such as the reset is completed, the radiation image imaging apparatus 1 transmits the interlock release signal to the radiation generating apparatus 55 through the relay 54 and performs the DES image obtaining sequence. If the interlock release signal transmitted through the relay 54 from the radiation image imaging apparatus 1 is received, the radiation generating apparatus 55 irradiates the radiation from the X-ray tube of the radiation source 52 based on the set radiation irradiating condition. Specifically, the radiation is irradiated at a preset first tube voltage, and after a predetermined radiation irradiating interval elapses, the radiation is irradiated at a preset second tube voltage.

The term of irradiating radiation with the radiation source 52 (radiation irradiating term) is synchronized with the accumulating term in the radiation image imaging apparatus 1 so that the radiation is irradiated by the radiation source 52 during the accumulating term in the radiation image imaging apparatus 1.

Figure 9:
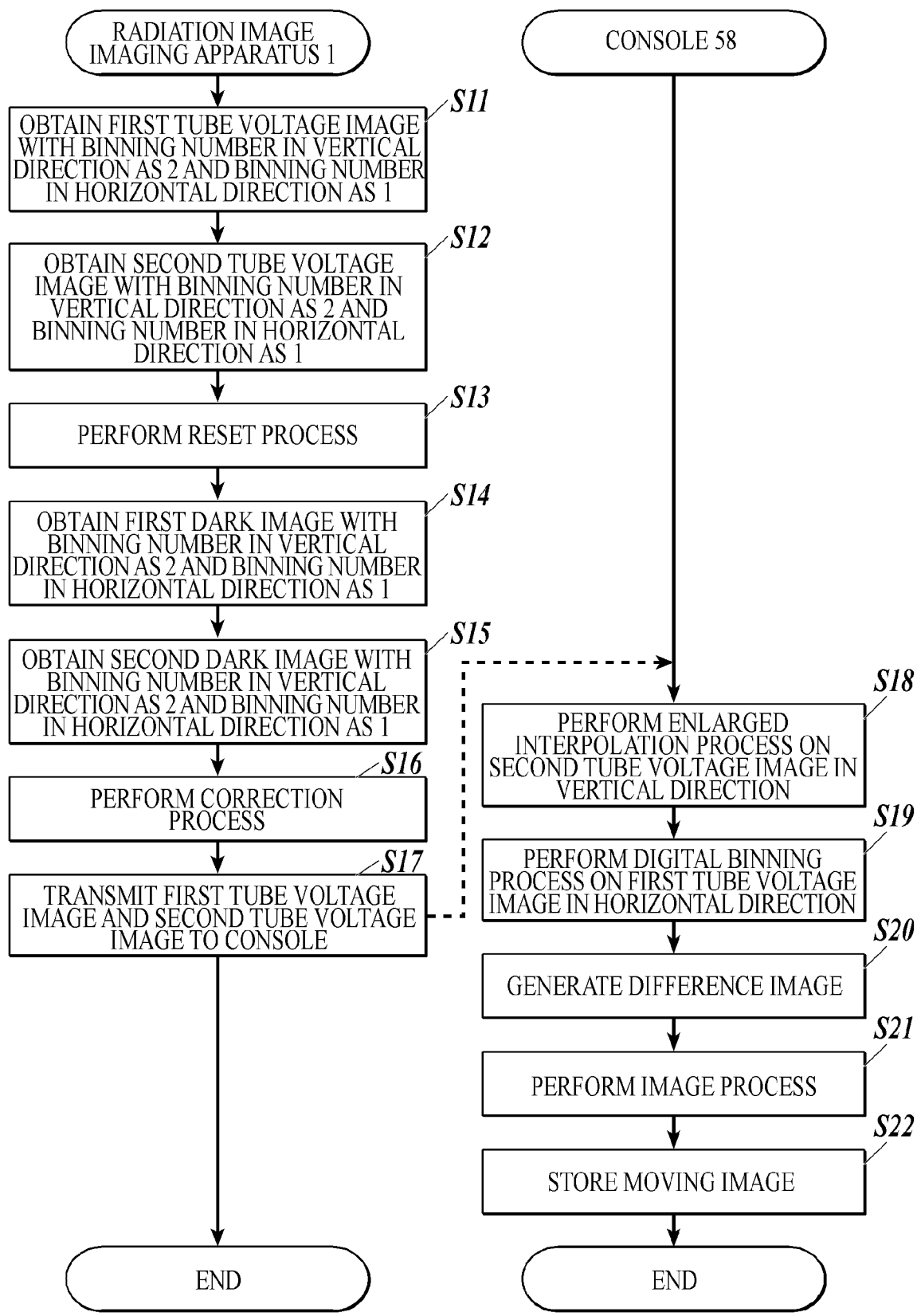
FIG. 9 is a diagram showing a flow of a DES image obtaining sequence.

FIG. 9 is a flowchart showing a flow of the DES image obtaining sequence performed in the radiation image imaging apparatus 1 and the console 58 in response to the pressing of the second switch in the DES mode. The process of the DES image obtaining sequence in the radiation image imaging apparatus 1 side is performed by the controller 22. The process on the console 58 side is performed by the controller 58b. The DES image obtaining sequence is described.

First, the controller 22 obtains the first tube voltage image with the binning number in the vertical direction as 2 and the binning number in the horizontal direction as 1 according to the image obtaining condition (step S11).

In step S11, the controller 22 applies the off voltage to all of the scanning lines 5 using the scanning driver 15 to progress the process to the charge accumulating mode in which the charge is accumulated in the radiation detecting element 7. If the predetermined accumulating time passes, the controller 22 applies on voltage to two adjacent lines at a time from the line L1 to the line Lx direction using the gate driver 15b of the scanning driver 15 to release the charge of the radiation detecting element 7 in two lines at the same time. With this, the process progresses to the readout mode in which the readout circuit 17 converts the released charge to the image data. With this, the first tube voltage image is obtained with the binning performed with the binning number in the vertical direction as 2. The obtained first tube voltage image is stored in the storage 40 corresponded to the tube voltage.

Next, the controller 22 obtains the second tube voltage image with the binning number in the vertical direction as 2 and the binning number in the horizontal direction as 1 according to the image obtaining condition (step S12).

The process in step S12 is the same as step S11 and the description is to be referred.

As described above, the first tube voltage image and the second tube voltage image used in the DES are obtained with the binning number in the vertical direction as 2 and the binning number in the horizontal direction as 1. With this, the charge readout time (readout mode time) can be shortened and the high speed image readout (image obtaining at a high frame rate) can be performed. Since the readout of the first tube voltage image is performed at a high speed, the imaging interval (radiation irradiating interval) of the first tube voltage image and the second tube voltage image can be made shorter, and the body movement can be suppressed. Since the binning is not performed in the horizontal direction when the image is obtained, the image can be obtained at a high frame rate without decreasing the resolution in the horizontal direction.

Next, the controller 22 performs the reset process (step S13).

Next, the controller 22 obtains the dark image (first dark image) corresponding to the first tube voltage image with the binning number in the vertical direction as 2 and the binning number in the horizontal direction as 1 (step S14).

That is, the controller 22 progresses the process to the charge accumulating mode to accumulate the charge in the radiation detecting element 7 when the off voltage is applied to all of the scanning lines 5 with the scanning driver 15 in a state that the radiation is not irradiated on the radiation image imaging apparatus 12. If a predetermined accumulating time passes, the controller 22 applies the on voltage to two adjacent lines at a time from the line L1 to the line Lx direction of the scanning line 5 using the gate driver 15b of the scanning driver 15. The charge for two lines in the radiation detecting element 7 is released at the same time, and the released charge is converted to the image data by the readout circuit 17. With this, the first dark image is obtained.

When the dark image is obtained, the image is obtained with the binning number in the vertical direction as 2 and the binning number in the horizontal direction as 1. With this, the charge readout time (readout mode time) can be shortened, and the image readout at a high speed becomes possible.

Next, the controller 22 obtains the dark image (second dark image) corresponding to the second tube voltage image with the binning number in the vertical direction as 2 and the binning number in the horizontal direction as 1 (step S15).

The process in step S15 is similar to step S14 and the process is to be referred.

The order that the first tube voltage image (first dark image) and the second tube voltage image (second dark image) is obtained is not limited to the above, and the second tube voltage image (second dark image) can be obtained before obtaining the first tube voltage image (first dark image).

Next, the controller 22 performs on the first tube voltage image obtained in step S11 correction processes such as the offset correction process using the first dark image obtained in step S14, gain correction process, defective pixel correction process, and lag (after image) correction process. The controller 22 performs on the second tube voltage image obtained in step S12 correction processes such as the offset correction process using the second dark image obtained in step S15, gain correction process, defective pixel correction process, and lag (after image) correction process (step S16). Then, the image data of the corrected first tube voltage image and the corrected second voltage image is transmitted with the communicating unit 39 to the console 58 (step S17).

If the image data of the first tube voltage image and the second tube voltage image is received from the radiation image imaging apparatus 1 by the communicating unit 58c in the console 58, the controller 58b performs the enlarged interpolation process on the second tube voltage image so that the binning number in the vertical direction is 1 and the binning number in the horizontal direction is 1 (step S18).

Since the binning number in the vertical direction×binning number in the horizontal direction is 2×1 in the received second tube voltage image, in step S18, the enlarged interpolation process is performed in the vertical direction, and the second tube voltage image is generated with the binning number in the vertical direction×binning number in the horizontal direction as 1×1. Since the second tube voltage image is also used as the diagnostic image, enlarged interpolation is performed so that the binning number in the vertical direction×binning number in the horizontal direction is 1×1 to match the pixel size in the vertical direction to the pixel size in the horizontal direction. With this, the second tube voltage image with the same resolution as when the binning is not performed is generated.

Next, the controller 58b performs the digital binning process on the first tube voltage image with the binning number in the vertical direction as 2 and the binning number in the horizontal direction as 2 (step S19).

The binning number in the vertical direction×binning number in the horizontal direction is 2×1 in the received first tube voltage image. Therefore, in step S19, the adjacent two pixels in the vertical direction are added or averaged to match the pixel size in the horizontal direction to the pixel size in the vertical direction to generate the first tube voltage image with the binning number in the vertical direction× binning number in the horizontal direction as 2×2. Here, since the first tube voltage image is an image imaged with a low tube voltage, the granularity is poor. However, the noise can be reduced by performing the digital binning.

Preferably, as in the present embodiment, the image data is transferred from the radiation image imaging apparatus 1 to the console 58, and then the enlarged interpolation process is performed. This is because the data transfer amount from the radiation image imaging apparatus 1 to the console 58 can be decreased more than when the enlarged interpolation process is performed in the radiation image imaging apparatus 1. However, the controller 22 can perform the enlarged interpolation process in the radiation image imaging apparatus 1 and then the image data can be transferred from the radiation image imaging apparatus 1 to the console 58 by the communicating unit 39. Similarly, the controller 22 can perform the binning process in the radiation image imaging apparatus 1 and then the image data can be transferred from the radiation image imaging apparatus 1 to the console 58 by the communicating unit 39.

In order to obtain the first tube voltage image with the binning number in the vertical direction×binning number in the horizontal direction as 2×2, and the second tube voltage image with the binning number in the vertical direction× binning number in the horizontal direction as 1×1, readout can be performed for two lines at the same time in the radiation image imaging apparatus 1 to obtain the first tube voltage image and readout can be performed one line at a time to obtain the second tube voltage image. However, in this case, in order to stabilize the image, a reset process needs to be performed after the readout of the first tube voltage image, and then the process needs to progress to the accumulating of the second tube voltage image. Therefore, it is difficult to switch the imaging of the first tube voltage image and the imaging of the second tube voltage image to high speed, and the body movement cannot be suppressed. Further, in the radiation image imaging apparatus 1, if the line number of the readout performed at the same time is changed to 2:1 in the imaging of the first tube voltage image and the imaging of the second tube voltage image, the radiation entering photon number is 2:1. Therefore, a change in the sensitivity of the charge amplifier of the amplifying circuit 18 is necessary between the two imaging. However, if the sensitivity of the charge amplifier is changed within a short period of time, this may be the reason for an artifact occurring.

Turning to the present embodiment, the number of lines that readout is performed at the same time is the same between the imaging of the first tube voltage image and the imaging of the second tube voltage image. Therefore, the imaging of the first tube voltage image and the imaging of the second tube voltage image can be switched with high speed, and the body movement can be suppressed. Further, the artifact occurring can be suppressed.

Next, the controller 58b generates the difference image from the first tube voltage image and the second tube voltage image (step S20).

After logarithmic conversion of the first tube voltage image and the second tube voltage image, the difference image is generated by multiplying the weighted coefficient to the signal value of the corresponding pixels in both images and obtaining the difference. Here, since the binning number is different in the first tube voltage image and the second tube voltage image, the difference image can be generated after converting the binning number of one image to the binning number of the other image.

The difference image, the first tube voltage image with the binning number vertical 2×horizontal 2 and the first tube voltage image with the binning number vertical 1×horizontal 2 can be obtained by the following flow of (1) to (4).

(1) After the logarithmic conversion is performed on each of the first tube voltage image and the second tube voltage image received from the radiation image imaging apparatus 1, the weighted coefficient is multiplied on the signal value of the corresponding pixels in both images and the difference is obtained to generate the difference image with the binning number vertical 2×horizontal 1.

(2) The enlarged interpolation process is performed in the vertical direction of the difference image or the digital binning process is performed in the horizontal direction of the difference image so that the binning number of the difference image is vertical 1×horizontal 1 or vertical 2×horizontal 2.

(3) The enlarged interpolation process is performed on the second tube voltage image in the vertical direction so that the binning number is vertical 1×horizontal 1. Alternatively, the digital binning process can be performed on the second tube voltage image in the horizontal direction so that the binning number is vertical 2×horizontal 2.

(4) The digital binning process is performed on the first tube voltage image in the horizontal direction so that the binning number is vertical 2×horizontal 2. Alternatively, the enlarged interpolation process is performed on the first tube voltage image in the vertical direction so that the binning number is vertical 1×horizontal 1.

Next, the controller 58b performs an image process such as the gradation process and the frequency emphasizing process on the difference image, the first tube voltage image, and the second tube voltage image (step S21).

Then, the difference image, the first tube voltage image and the second tube voltage image which are processed are corresponded with the patient information and the imaging condition, and stored in the storage 59 (step S22). With this, the DES image obtaining sequence ends.

As described above, according to the DES image obtaining sequence, the readout of the first tube voltage image and the second tube voltage is performed with the binning number 2 in the vertical direction and the binning number 1 in the horizontal direction. Therefore, the readout can be performed at a high speed. Since the readout is performed with two lines at the same time, the influence of the noise of the horizontal pull can be reduced. In the imaging of the first tube voltage image and the second tube voltage image, the number of lines which is read out at the same time with the radiation image imaging apparatus 1 is the same. Therefore, the switch between the imaging of the first tube voltage image and the imaging of the second tube voltage image can be performed at a high speed. With this, the body movement of the subject and the artifact occurring can be suppressed.

The digital binning is performed on the first tube voltage image imaged with the low tube voltage so that the binning number in the vertical direction×binning number in the horizontal direction is 2×2. With this, the noise is decreased. The second tube voltage image is imaged with the high tube voltage and is also used as the diagnostic image. By performing the enlarged interpolation on such image, the image can be obtained with the same resolution as when the binning is not performed.

That is, according to the present embodiment, in the DES mode, both the readout of the image at the high speed and the obtaining of the image with high fineness can be achieved in the radiation image imaging apparatus 1.

Third Embodiment

The third embodiment is described below.

According to the third embodiment, the present invention is applied to tomosynthesis imaging.

Figure 10:
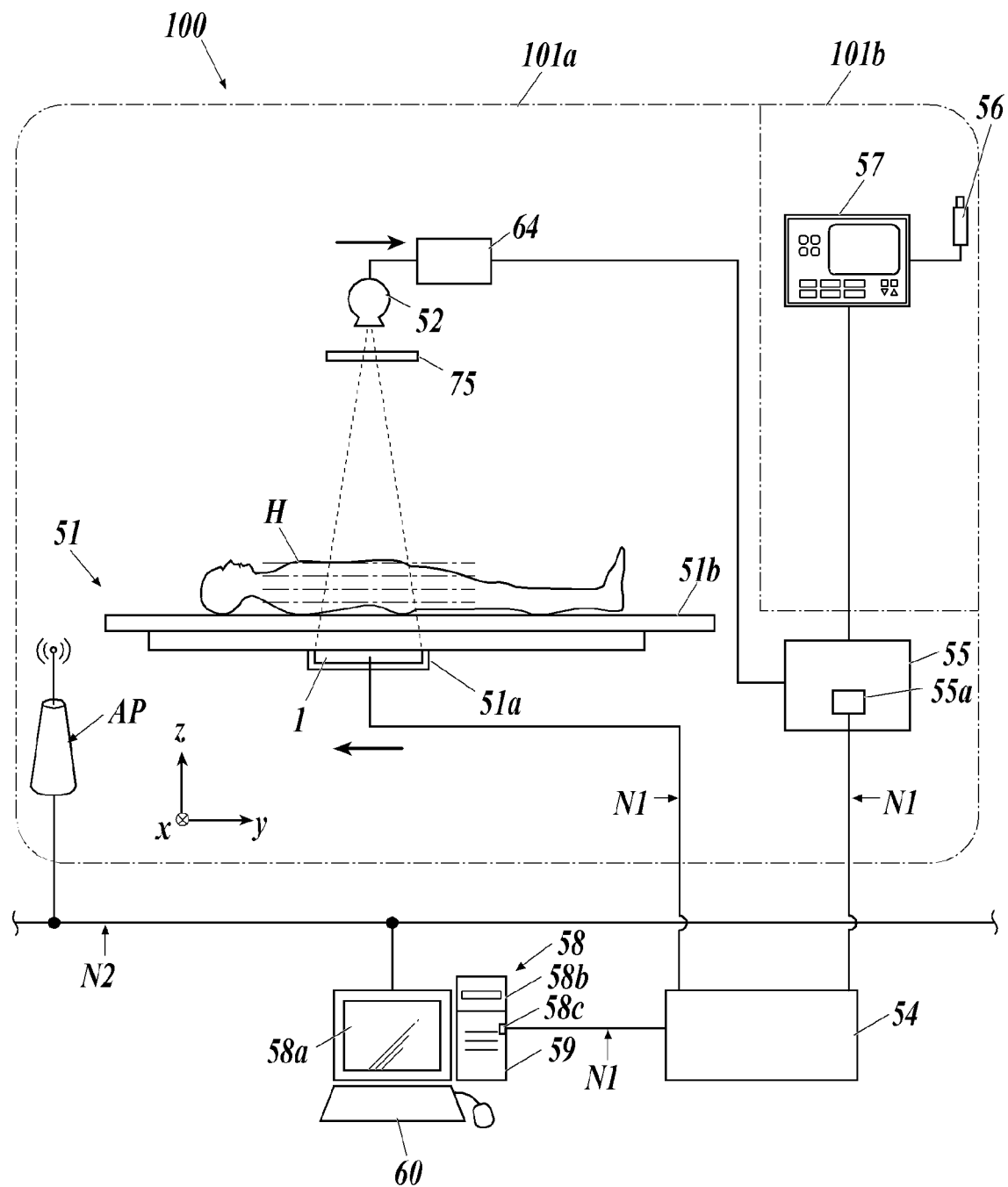
FIG. 10 is a diagram showing an entire configuration of a radiation image imaging system according to a third embodiment.

FIG. 10 is a diagram describing an entire configuration of a radiation image imaging system 100 according to the third embodiment. The radiation image imaging system 100 is a system which generates a tomographic image of a subject H using a projection image obtained by tomosynthesis imaging of the subject (site of a human person). In FIG. 10, the same reference numerals are used for the configuration described in the first embodiment.

According to the description below, the longitudinal direction of a subject table 51b (body axis direction of subject H positioned in the subject table 51b) is to be a y-axis direction, the direction orthogonal to the y-axis direction in the imaging surface (surface irradiated with radiation) is to be an x-axis direction, and the radiation irradiating direction (thickness direction of subject H) is to be a z-axis direction.

The radiation image imaging system 100 is provided in the imaging room 101a and inside and outside the front room 101b. In the imaging room 101a, a bucky apparatus 51 to which the radiation image imaging apparatus 1 can be mounted, a radiation source 52 provided with an X-ray tube (not shown) which generates the radiation irradiated to the subject, and the radiation generating apparatus 55 which controls the radiation source 52 are provided. An access point AP to relay the wireless communication between the radiation image imaging apparatus 1 and the console 58 is provided in the imaging room 101a.

The operating table 57 of the radiation generating apparatus 55 and the exposure switch 56 are provided in the front room 101b. FIG. 1 shows an example in which the relay 54 and the console 58 are provided outside the front room 101b. Alternatively, the above can be provided in the front room 101b.

According to the present embodiment, the bucky apparatus 51 is provided with the cassette holder 51a and the subject table 51b. As one example, FIG. 1 shows a diagram viewing from the side the bucky apparatus 51 to image the subject H in a lying position.

The cassette holder 51a holds the radiation image imaging apparatus 1.

The subject table 51b is a table which supports the subject H provided in a radiation irradiating direction of the radiation source 52. The subject table 51b includes a resin plate such as an acrylic plate, a plate of a non-organic material such as a carbon plate or a metallic plate.

The radiation image imaging apparatus 1 is positioned so that the direction of the signal lines 6 (vertical direction) matches the moving direction of the radiation source 52. For example, when the radiation image imaging apparatus 1 and the console 58 are connected by wired communication, the connector 39b can be positioned so that the LAN adaptor cannot be connected if the radiation image imaging apparatus 1 is loaded in the wrong direction. The exposure of the radiation may be allowed if the display 58a of the console 58 displays the direction to load the radiation image imaging apparatus 1 and a display to confirm the direction, and the user confirms the direction of the radiation image imaging apparatus 1 and inputs OK on the inputting unit 60. The radiation image imaging apparatus 1 may include an acceleration sensor or a terrestrial magnetism sensor, and a warning sound may be output when the radiation image imaging apparatus is loaded in the wrong direction.

A radiation source moving mechanism 64 is connected to the radiation source 52. The radiation source moving mechanism 64 moves the radiation source 52 along the body axis direction (y-axis direction) of the subject H on the subject table 51b. The radiation source moving mechanism 64 tilts the irradiating angle of the radiation source 52 depending on the position so that the radiation is irradiated from the radiation source 52 to the radiation image imaging apparatus 1 in the moved position. A collimator 75 which limits the irradiating region of the radiation irradiated from the radiation source 52 is provided in the radiation irradiating direction of the radiation source 52.

According to the present embodiment, as the radiation source 52, a radiation source which irradiates radiation shaped in a cone or a cone beam to the subject H and the radiation image imaging apparatus 1 is used.

If the second switch of the exposure switch 56 is pressed, and the interlock release signal is received from the radiation image imaging apparatus 1, the radiation generating apparatus 55 allows the radiation source 52 to irradiate radiation and allows the radiation source moving mechanism 64 to move the radiation source 52 along the subject table 51b (that is, in the y-axis direction) to change the relative position between the radiation source 52 and the radiation image imaging apparatus 1. With this, imaging is performed a predetermined amount of times (plurality of times) while the radiation source 52 moves from a start position to an end position determined in advance, and a projection image is obtained with the radiation image imaging apparatus 1 each time the subject is imaged. The optical axis of the radiation source 52 irradiates the center of the detector P of the radiation image imaging apparatus 1.

For example, the radiation is irradiated a predetermined number of times from the radiation source 52 (pulse irradiation) to obtain the projection image with the radiation image imaging apparatus 1 each time the radiation is irradiated. Alternatively, the radiation can be continuously irradiated from the radiation source 52, and during the above, the radiation image imaging apparatus 1 can perform the process to obtain the projection image a predetermined number of times.

According to the present embodiment, the radiation image imaging apparatus 1 is fixed, and the radiation source 52 is moved to change the relation of the positions between the radiation image imaging apparatus 1 and the radiation source 52. Alternatively, the radiation source 52 can be fixed, and the radiation image imaging apparatus 1 can be moved to change the relation of the positions between the radiation image imaging apparatus 1 and the radiation source 52. Alternatively, both the radiation source 52 and the radiation image imaging apparatus 1 are moved to change the relation of the positions between the radiation image imaging apparatus 1 and the radiation source 52.

The relay 54 is connected to the radiation image imaging apparatus 1, the radiation generating apparatus 55, the console 58, etc. through the network N1. The relay 54 includes a convertor (not shown) which converts the signal for LAN communication transmitted from the console 58 to the radiation generating apparatus 55 to a signal for the radiation generating apparatus 55, and vice versa.

Next, the operation of the radiation image imaging system 100 is described. According to the present embodiment, as one example, imaging by projection imaging by pulsed irradiation is described.

First, the person who performs the imaging prepares for imaging. For example, the person who performs the imaging uses the input unit 60 on the console 58 to select the patient information, the imaging condition (for example, imaging site, imaging direction, position of radiation source 52 when projection image is obtained), and image reconstruction condition (for example, slice height, slice interval). The person who performs the imaging positions the subject, the radiation source 52, and the radiation image imaging apparatus 1.

If the imaging condition is selected by the input unit 60 on the console 58, the controller 58b uses the communicating unit 58c to transmit the image start instruction with the selected imaging condition to the radiation generating apparatus 55 and the radiation image imaging apparatus 1. If the imaging condition is received, the radiation generating apparatus 55 sets the radiation irradiating condition according to the imaging condition. If the imaging condition is received, the controller 22 of the radiation image imaging apparatus 1 reads out from the storage 40 the image obtaining condition according to the imaging condition and sets the conditions.

The radiation irradiating condition and the image obtaining condition according to the imaging condition can be stored in the storage 59. The console 58 can readout the radiation irradiating condition and the image obtaining condition according to the imaging condition from the storage 59 to transmit the conditions to the radiation generating apparatus 55 and the radiation image imaging apparatus 1 and set the conditions.

Here, the radiation irradiating conditions include, pulse rate, pulse width, pulse interval, tube voltage, tube current, radiation irradiating position, and image number.

The image obtaining condition includes, a frame rate, accumulating time, charge readout time, binning number, and frame number. According to the present embodiment, binning number in the vertical direction>binning number in the horizontal direction. For example, binning number in the vertical direction=2, binning number in the horizontal direction=1. In the description below, the binning number in the vertical direction=2, binning number in the horizontal direction=1.

If the imaging preparation is complete, the person who performs the imaging presses the first switch of the exposure switch 56, and then presses the second switch. If the first switch is pressed, the exposure switch 56 transmits the start signal to the radiation generating apparatus 55 through the operating table 57. If the start signal is received, the radiation generating apparatus 55 starts rotating the anode of the X-ray tube in the radiation source 52, and sets the radiation source 52 to a standby state. The pressing notifying signal of the first switch is transmitted to the radiation image imaging apparatus 1 through the relay 54.

If the pressing notifying signal of the first switch is received by the communicating unit 39, the controller 22 of the radiation image imaging apparatus 1 sequentially applies on voltage to each line L1 to Lx of the scanning line 5 using the gate driver 15b of the scanning driver 15 and releases the charge remaining in the radiation detecting element 7 to the signal line 6. With this, the controller 22 performs the reset process for the radiation detecting element 7 to remove the remaining charge from the radiation detecting element 7.

If the second switch is pressed, the exposure switch 56 transmits the radiation irradiating start signal to the radiation generating apparatus 55 through the operating table 57.

If the radiation irradiating start signal is received from the exposure switch 56, the radiation generating apparatus 55 transmits the pressing notifying signal of the second switch to the radiation image imaging apparatus 1 through the relay 54. If the pressing notifying signal of the second switch is received, and the preparations are finished such as the reset being complete, the radiation image imaging apparatus 1 transmits to the radiation generating apparatus 55 the interlock release signal through the relay 54 and performs the tomographic image obtaining sequence described later. If the interlock release signal transmitted from the radiation image imaging apparatus 1 through the relay 54 is received, based on the radiation irradiating conditions, the radiation generating apparatus 55 irradiates radiation from the X-ray tube of the radiation source 52 while moving the radiation source 52 along the subject table 51b (that is, y-axis direction) with the radiation source moving mechanism 64.

Figure 11:
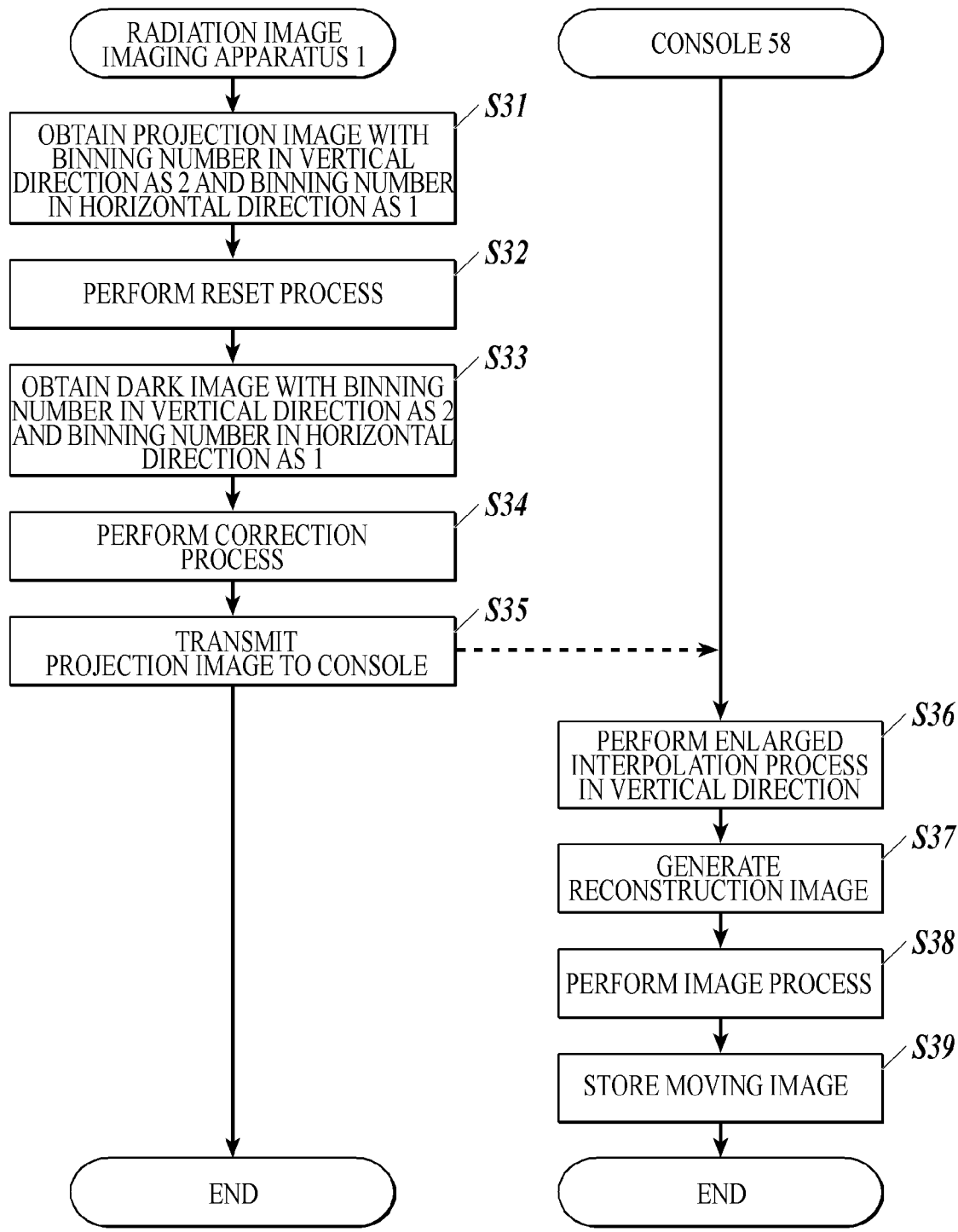
FIG. 11 is a diagram showing a flow of a tomographic image obtaining sequence.

FIG. 11 is a flowchart showing a flow of a tomographic image obtaining sequence performed by the radiation image imaging apparatus 1 and the console 58 in response to pressing the second switch. The process of the tomographic image obtaining sequence performed on the radiation image imaging apparatus 1 side is performed by the controller 22. The process performed on the console 58 side is performed by the controller 58b. The tomographic image obtaining sequence is described below.

The controller 22 obtains the projection image with the binning number in the vertical direction as 2 and the binning number in the horizontal direction as 1 (step S31).

In step S31, the controller 22 progresses the process to the charge accumulating mode in which the scanning driver 15 applies off voltage to all scanning lines 5 to accumulate charge in the radiation detecting element 7. If the predetermined accumulating time passes, the controller 22 applies on voltage to two adjacent lines at a time from the line L1 to the line Lx direction using the gate driver 15b of the scanning driver 15 and the radiation detecting element 7 releases charge for two lines at the same time. With this, the process progresses to the readout mode in which the released charge is converted to the image data by the readout circuit 17. Therefore, the projection image can be obtained with the binning performed with the binning number in the vertical direction as 2. The controller 22 repeats the charge accumulating mode and the readout mode a predetermined number of times based on the set image obtaining condition. With this, the image data of the predetermined number of projection images can be obtained. The obtained projection images are stored in the storage 40 corresponded with the imaging order.

In tomosynthesis, the radiation is irradiated while the radiation source 52 (and/or the radiation image imaging apparatus 1) is moving. Therefore, blurring occurs in the moving direction of the radiation source 52, that is, the vertical direction of the projection image. Moreover, blurring in the vertical direction occurs from the influence of the filter used in the image reconstruction process later on. Therefore, the advantages of obtaining the image with high fineness in the vertical direction is small. As described above, the projection image is obtained with the binning number in the vertical direction as 2 and the binning number in the horizontal direction as 1. With this, the charge readout time (readout mode time) can be shortened without applying influence to the image and the image can be read out at a high speed (image obtaining at a high frame rate). Since the binning in the horizontal direction is not performed, the image can be obtained at a high frame rate without decreasing the resolution in the horizontal direction.

After the charge accumulating mode and the readout mode are repeated a predetermined number of times and the obtaining of the string of projection images ends, the controller 22 performs the reset process (step S32).

Next, the controller 22 obtains the dark image with the binning number in the vertical direction as 2 and the binning number in the horizontal direction as 1 (step S33). That is, the scanning driver 15 applies the off voltage to all of the scanning lines 5 in the state that the radiation is not irradiated on the radiation image imaging apparatus 1 and the controller 22 progresses the process to the charge accumulating mode in which the charge is accumulated in the radiation detecting element 7. After a predetermined amount of accumulating time passes, the gate driver 15b of the scanning driver 15 applies on voltage to two adjacent lines at a time from the line L1 to the line Lx direction of the scanning line 5, and the controller 22 releases charge for two lines of the radiation detecting element 7 at the same time. With this, the controller 22 converts the released charge to the image data with the readout circuit 17 and obtains the dark image.

Only one dark image may be obtained or a plurality of dark images can be obtained and averaged. When the dark image is obtained, the moving image is obtained with the binning number in the vertical direction as 2 and the binning number in the horizontal direction as 1. With this, the charge readout time (readout mode time) can be shortened and the image readout can be performed at a high speed (image obtaining at a high frame rate).

Next, the controller 22 performs the correction process such as the offset correction process using the dark image obtained in step S33, the gain correction process, the defective pixel correction process, lag (after image) correction process on the projection images obtained in step S31 (step S34). The corrected projection image is transmitted to the console 58 by the communicating unit 39 (step S35).

In the console 58, if the image data of the projection images is received from the radiation image imaging apparatus 1 by the communicating unit 58c, the controller 58b performs the enlarged interpolation process on the projection images in the vertical direction (direction of the pixels aligned in the extending direction of the signal lines 6 in the radiation image imaging apparatus 1) (step S36).

In step S36, the enlarged interpolation is performed on the projection image with the binning number in the vertical direction×binning number in the horizontal direction as 2×1 to be 1×1 to match the pixel size in the vertical direction to the pixel size in the horizontal direction. With this, the projection image is generated with the same resolution as when the binning is not performed.

Next, the controller 58b generates the reconstruction image using the string of projection images (step S37).

Figure 12:
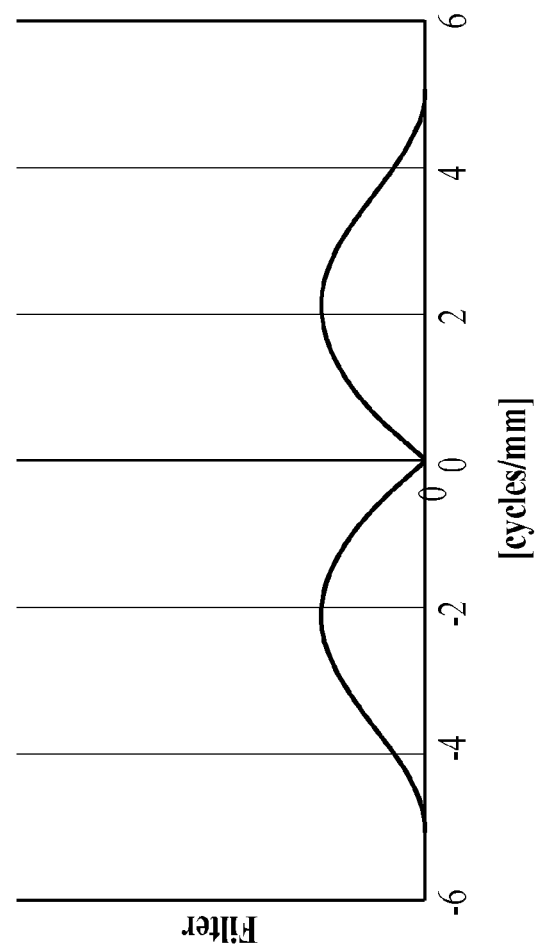
FIG. 12 is a diagram describing a Chesler filter.

In step S37, for example, the Feldkamp method is used to generate the reconstruction image (tomographic image) from the string of projection images. According to the Feldkamp method, the projection image is filtered in the moving direction of the radiation source 52 (extending direction of signal line 6) by a filter such as a Chesler filter shown in FIG. 12 to blur the high frequency region in order to reduce the noise. Then, back projection is performed to generate the reconstruction image.

The reconstruction image is the plurality of two dimensional tomographic images with the plurality of cross section of the subject H shown with the long and short dash line in FIG. 10.

After the reconstruction image is generated using the string of projection images, the enlarged interpolation process can be performed on the reconstruction image.

Next, the controller 58b performs the image process such as the gradation process and the frequency emphasizing process on the reconstruction image (step S38).

Then, the processed reconstruction image is stored in the storage 59 corresponded to the patient information, the imaging condition and the reconstruction condition (step S39), and the tomographic image obtaining sequence ends.

In the tomosynthesis, the radiation is irradiated while the radiation source 52 (and/or the radiation image imaging apparatus 1) is moving. Therefore, the blur occurs in the projection image in the vertical direction which is the moving direction of the radiation source 52 (that is, the extending direction of the signal line 6). The blur in the vertical direction may also occur due to the influence of the filter when the image is reconstructed. Therefore, the advantage of obtaining a highly fine image in the vertical direction is small. In the tomographic image obtaining sequence, readout of the projection image is performed with the binning number in the vertical direction as 2 and the binning number in the horizontal direction as 1. With this, the charge readout time (readout mode time) can be shortened and the image can be readout at a high speed (image obtaining at a high frame rate) without providing influence on the reconstruction image. Since the binning is not performed in the horizontal direction, the resolution in the horizontal direction does not decrease and the image can be obtained at a high frame rate. Further, the enlarged interpolation is performed for the pixel in the vertical direction, and the projection image can be obtained at the same resolution as when the binning is not performed in the vertical direction.

When the gate driver 15b of the scanning driver 15 applies on voltage to the line of the scanning line 5 to readout the charge from the radiation detecting element 7, the noise from the horizontal pull (line noise) may occur.

Such noise occurs each time the line is read out. By performing the readout for two lines at the same time, the signal readout is twice the amount but the noise is in the amount of one readout. Therefore, the SN ratio can be increased and the influence of the horizontal pull noise can be decreased.

That is, according to the present embodiment, in the tomosynthesis imaging, both the readout of the high speed image and the obtaining of the highly fine image are possible in the radiation image imaging apparatus 1.

Various embodiments are described above but the embodiments described above are merely preferable examples, and the embodiments are not limited to the above.

For example, according to the present embodiment, in the radiation image imaging apparatus 1, the charge readout is performed with the binning number in the vertical direction as 2 and the binning number in the horizontal direction as 1. However, the binning number is one example, and is not limited to the above.

The other detailed configuration and the detailed operation of the devices included in the radiation image imaging system can be suitably changed without leaving the scope of the present invention.

Although embodiments of the present invention have been described and illustrated in detail, the disclosed embodiments are made for purposes of illustration and example only and not limitation. The scope of the present invention should be interpreted by terms of the appended claims.

The entire disclosure of Japanese Patent Application No. 2018-162271, filed on Aug. 31, 2018, including description, claims, drawings and abstract is incorporated herein by reference in its entirety.

What is claimed is:

1. A radiation image imaging apparatus comprising:
    a plurality of scanning lines and a plurality of signal lines provided intersecting with each other;
    a plurality of radiation detecting elements positioned two-dimensionally, with the scanning lines connected in a horizontal direction and the signal lines connected in a vertical direction;
    a switch which is provided for each radiation detecting element, which is in an off state if off voltage is applied to the connected scanning line, which is in an on state if charge generated in the radiation detecting element is accumulated in the radiation detecting element and the on voltage is applied to the connected scanning line, and which releases the charge to the signal line from the radiation detecting element;
    a scanning driver which applies voltage to the scanning line and which switches between the on voltage and the off voltage;
    a readout circuit which reads out charge released from the radiation detecting element to obtain an image; and
    a hardware processor which controls the scanning driver to apply the on voltage to a plurality of adjacent scanning lines at the same time to obtain the image in which a binning number in an extending direction of the signal line is larger than a binning number in an extending direction of the scanning line; and
    which performs an enlarged interpolation process on the obtained image in an extending direction of the signal line to generate an image in which a pixel size in the extending direction of the signal line matches a pixel size in the extending direction of the scanning line.

2. The radiation image imaging apparatus according to claim 1, wherein the hardware processor further performs a digital binning process on the obtained image in an extending direction of the scanning line to generate an image in which the pixel size in the extending direction of the scanning line matches the pixel size in the extending direction of the signal line.

3. The radiation image imaging apparatus according to claim 2, wherein,
    if the radiation irradiated at a first tube voltage is accumulated in the radiation detecting element to be read out to obtain a first tube voltage image and the radiation irradiated at a second tube voltage which is higher than the first tube voltage is accumulated in the radiation detecting element to be read out to obtain a second tube voltage image before or after obtaining the first tube voltage image, the hardware processor controls the scanning driver to set a number of scanning lines on which on voltage is applied at the same time to be the same between when the first tube voltage image is obtained and when the second tube voltage image is obtained,
    the hardware processor performs the enlarged interpolation process on the second tube voltage image in the extending direction of the signal line to match the pixel size in the extending direction of the signal line to the pixel size in the extending direction of the scanning line, and
    the digital binning process is performed on the first tube voltage image in the extending direction of the scanning line to match the pixel size in the extending direction of the scanning line to the pixel size in the extending direction of the signal line.

4. The radiation image imaging apparatus according to claim 1, wherein,
    if the radiation irradiated at a first tube voltage is accumulated in the radiation detecting element to be read out to obtain a first tube voltage image and the radiation irradiated at a second tube voltage which is higher than the first tube voltage is accumulated in the radiation detecting element to be read out to obtain a second tube voltage image before or after obtaining the first tube voltage image, the hardware processor controls the scanning driver to set a number of scanning lines on which on voltage is applied at the same time to be the same between when the first tube voltage image is obtained and when the second tube voltage image is obtained.

5. A radiation image imaging system comprising:
    a radiation image imaging apparatus including:
    a plurality of scanning lines and a plurality of signal lines provided intersecting with each other;
    a plurality of radiation detecting elements positioned two-dimensionally, with the scanning lines connected in a horizontal direction and the signal lines connected in a vertical direction;
    a switch which is provided for each radiation detecting element, which is in an off state if off voltage is applied to the connected scanning line, which is in an on state if charge generated in the radiation detecting element is accumulated in the radiation detecting element and the on voltage is applied to the connected scanning line, and which releases the charge to the signal line from the radiation detecting element;

a scanning driver which applies voltage to the scanning line and which switches between the on voltage and the off voltage;

a readout circuit which reads out charge released from the radiation detecting element to obtain an image; and a hardware processor which controls the scanning driver to apply the on voltage to a plurality of adjacent scanning lines at the same time to obtain the image in which a binning number in an extending direction of the signal line is larger than a binning number in an extending direction of the scanning line;

a radiation source which irradiates radiation on the radiation image imaging apparatus; and a console which performs an image process on the image obtained by the radiation image imaging apparatus, wherein, the console performs an enlarged interpolation process on the image obtained from the radiation image imaging apparatus in an extending direction of the signal line to generate an image in which a pixel size in the extending direction of the signal line matches a pixel size in the extending direction of the scanning line.

6. The radiation image imaging system according to claim 5, wherein the console further performs a digital binning process on the obtained image in an extending direction of the scanning line to generate an image in which the pixel size in the extending direction of the scanning line matches the pixel size in the extending direction of the signal line.

7. The radiation image imaging system according to claim 6, wherein, if the radiation irradiated at a first tube voltage is accumulated in the radiation detecting element to be read out to obtain a first tube voltage image and the radiation irradiated at a second tube voltage which is higher than the first tube voltage is accumulated in the radiation detecting element to be read out to obtain a second tube voltage image before or after obtaining the first tube voltage image, the hardware processor controls the scanning driver to set a number of scanning lines on which on voltage is applied at the same time to be the same between when the first tube voltage image is obtained and when the second tube voltage image is obtained, the console performs the enlarged interpolation process on the second tube voltage image in the extending direction of the signal line to match the pixel size in the extending direction of the signal line to the pixel size in the extending direction of the scanning line, and the digital binning process is performed on the first tube voltage image in the extending direction of the scanning line to match the pixel size in the extending direction of the scanning line to the pixel size in the extending direction of the signal line.

8. The radiation image imaging system according to claim 5, wherein, if the radiation irradiated at a first tube voltage is accumulated in the radiation detecting element to be read out to obtain a first tube voltage image and the radiation irradiated at a second tube voltage which is higher than the first tube voltage is accumulated in the radiation detecting element to be read out to obtain a second tube voltage image before or after obtaining the first tube voltage image, the hardware processor controls the scanning driver to set a number of scanning lines on which on voltage is applied at the same time to be the same between when the first tube voltage image is obtained and when the second tube voltage image is obtained.

9. The radiation image imaging system according to claim 5, wherein, the radiation source and/or the radiation image imaging apparatus is moved in a predetermined moving direction so that the radiation source irradiates radiation while changing a relation of positions between the radiation source and the radiation image imaging apparatus and the radiation image imaging apparatus obtains a projection image of a subject positioned between the radiation source and the radiation image imaging apparatus a predetermined number of times, the radiation image imaging apparatus is positioned so that the extending direction of the signal line matches the predetermined moving direction, and the console reconstructs the projection image on which the enlarged interpolation process is performed in the extending direction of the signal line to generate a reconstruction image of the subject.

10. The radiation image imaging system according to claim 9, wherein the console performs a filter process to blur a high frequency region on the projection image in the extending direction of the signal line and then performs back projection of the projection image to generate the reconstruction image of the subject.

* * * * *